US012325288B2

(12) United States Patent
Kim

(10) Patent No.: US 12,325,288 B2
(45) Date of Patent: Jun. 10, 2025

(54) VEHICLE AIR VENT STRUCTURE AND OPERATION METHOD THEREOF

(71) Applicant: HYUNDAI MOBIS CO., LTD., Seoul (KR)

(72) Inventor: Won Sik Kim, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 393 days.

(21) Appl. No.: 17/517,881

(22) Filed: Nov. 3, 2021

(65) Prior Publication Data
US 2022/0410666 A1    Dec. 29, 2022

(30) Foreign Application Priority Data

Jun. 28, 2021   (KR) .......................... 10-2021-0084213

(51) Int. Cl.
*B60H 1/34* (2006.01)
*B60H 1/00* (2006.01)

(52) U.S. Cl.
CPC ....... *B60H 1/3421* (2013.01); *B60H 1/00964* (2013.01); *B60H 2001/3471* (2013.01)

(58) Field of Classification Search
CPC   B60H 1/0065; B60H 1/00871; B60H 1/3421; B60H 2001/3471
See application file for complete search history.

(56) References Cited

U.S. PATENT DOCUMENTS

| | | | |
|---|---|---|---|
| 5,117,646 A * | 6/1992 | Nose | F25B 49/022 62/181 |
| 10,807,443 B2 | 10/2020 | Stiver | |
| 11,124,048 B2 | 9/2021 | Cho | |
| 2018/0170149 A1* | 6/2018 | Fidh | B60H 1/3421 |
| 2019/0111766 A1 | 4/2019 | Miedl et al. | |
| 2019/0160919 A1* | 5/2019 | Hayashima | F24F 13/15 |
| 2020/0331324 A1 | 10/2020 | Wieczorek et al. | |

(Continued)

FOREIGN PATENT DOCUMENTS

| CN | 212667078 U | 3/2021 |
|---|---|---|
| DE | 10 2014 102 332 B4 | 8/2017 |

(Continued)

OTHER PUBLICATIONS

Hildebrand et al., EP0397909 and translation (Year: 1990).*

(Continued)

*Primary Examiner* — Steven S Anderson, II
(74) *Attorney, Agent, or Firm* — NSIP Law

(57) ABSTRACT

A vehicle air vent structure includes a vent duct having a front surface facing a vehicle interior and being open to form a discharge port configured to discharge air, a rear wing accommodated in a region of the discharge port and being rotatably coupled to the vent duct, a plurality of front wings disposed in a direction orthogonal to the rear wing behind the rear wing, a driving member mounted outside the vent duct and being coupled to the front wings to selectively rotate the front wings, and a spacer elongated in a width direction of the vent duct to rotate the plurality of front wings, wherein the front wings rotate together with the driving member, in response to a driving force being generated from the driving member and the front wings being manually rotatable, in response to the driving force being blocked from the driving member.

10 Claims, 20 Drawing Sheets

(56) References Cited

U.S. PATENT DOCUMENTS

2021/0031594 A1   2/2021  Schaal
2022/0099332 A1   3/2022  Groben et al.

FOREIGN PATENT DOCUMENTS

| DE | 10 2019 102 826 A1 | 8/2020 | |
|---|---|---|---|
| EP | 0397909 A1 * | 11/1992 | |
| JP | 11-14136 A | 1/1999 | |
| JP | 2000-108653 A | 4/2000 | |
| JP | 2000-247140 A | 9/2000 | |
| JP | 2008-155870 A | 7/2008 | |
| KR | 20-0110227 Y1 | 7/1995 | |
| KR | 10-1552787 B1 | 9/2015 | |
| KR | 10-2057550 B1 | 12/2019 | |
| WO | WO-2020160960 A1 * | 8/2020 | ........... B60H 1/3421 |

OTHER PUBLICATIONS

Mantey et al., WO2020160960 and translation (Year: 2020).*
Chinese Office Action Issued on Jan. 24, 2025, in Counterpart Chinese Patent Application No. 202111629024.X (10 Pages in Chinese, 9 Pages in English).

* cited by examiner

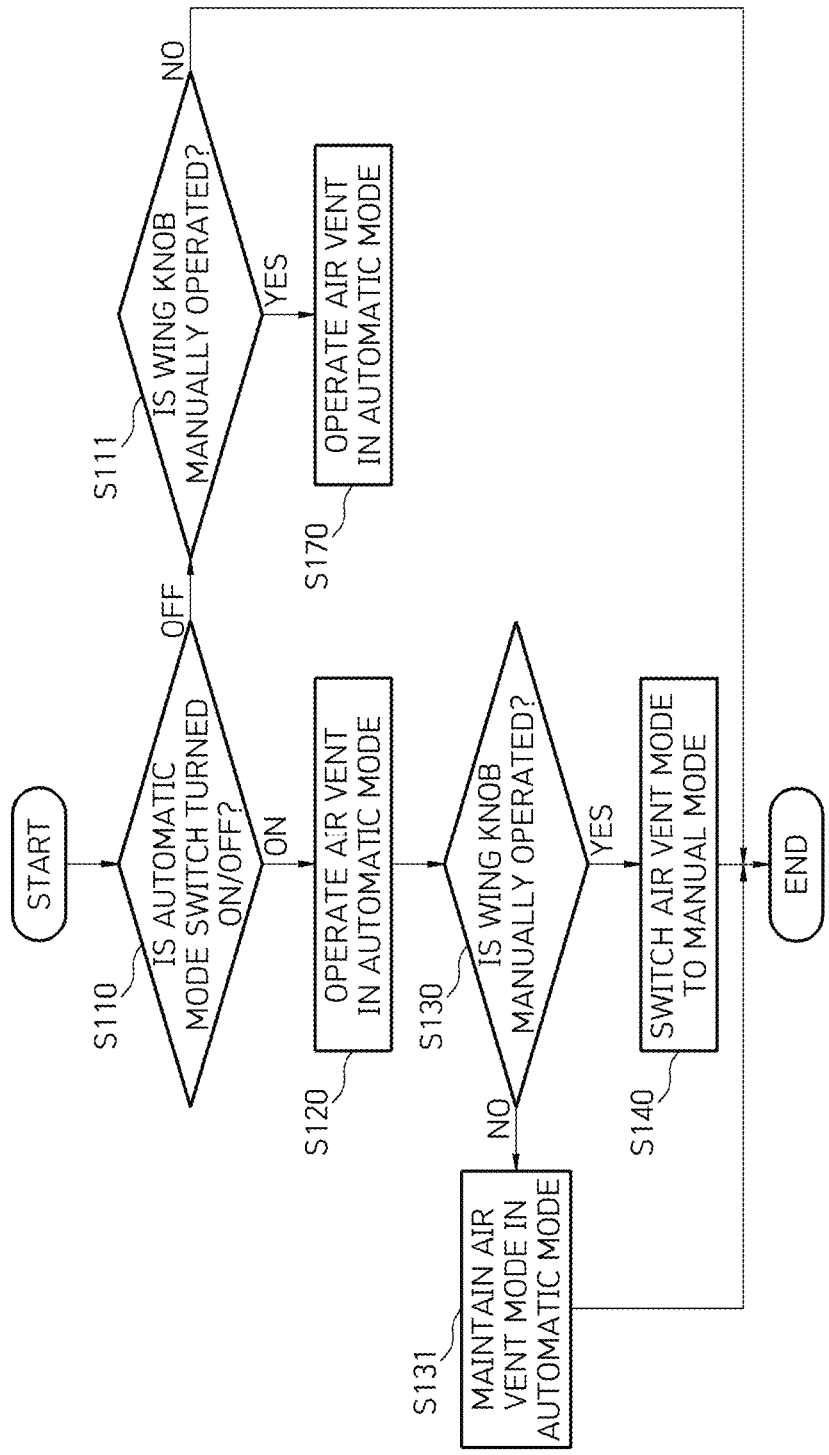

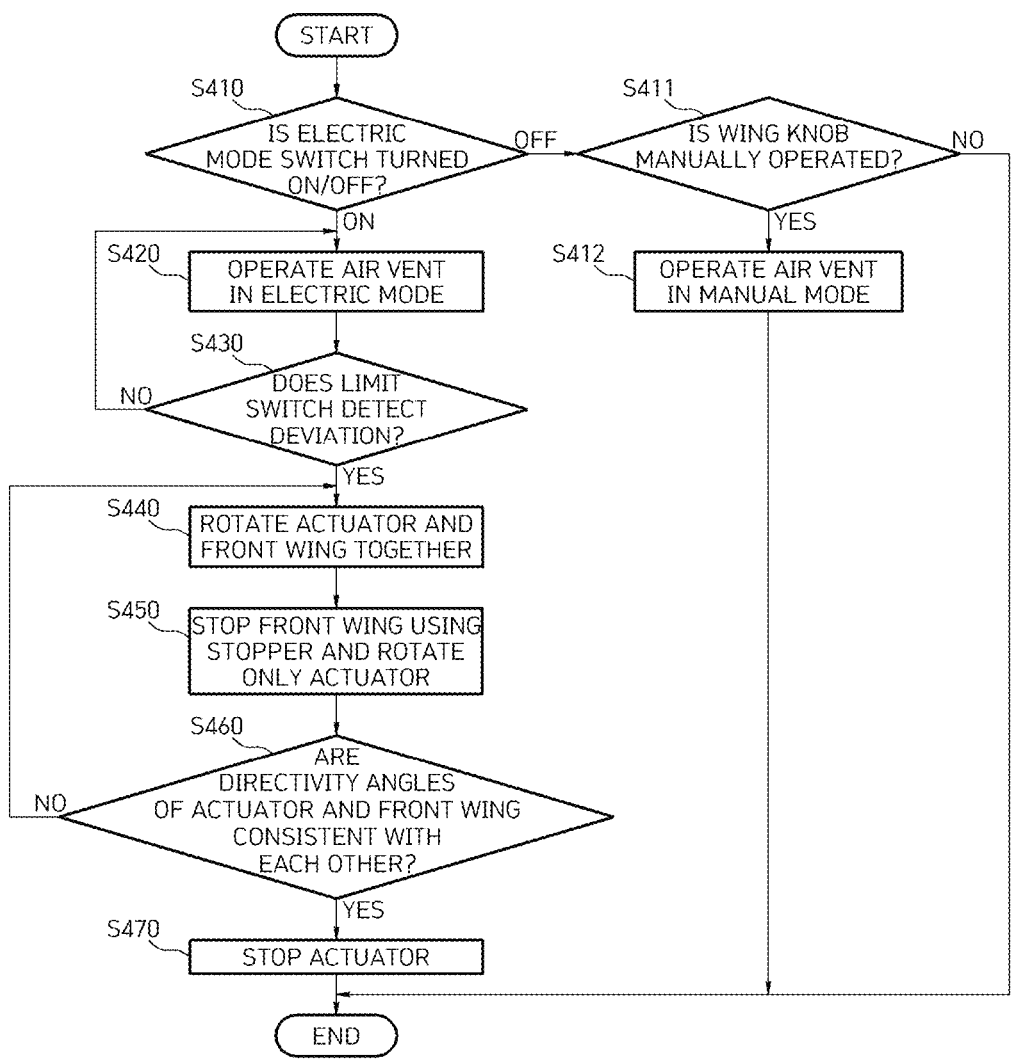

VEHICLE AIR VENT STRUCTURE AND OPERATION METHOD THEREOF

CROSS-REFERENCE TO RELATED APPLICATION

This application claims the benefit under 35 USC § 119(a) of Korean Patent Application No. 10-2021-0084213, filed on Jun. 28, 2021, in the Korean Intellectual Property Office, the entire disclosure of which is incorporated herein by reference for all purposes.

BACKGROUND

1. Field

The present invention relates to an air vent, and more particularly, to a vehicle air vent structure that changes a flow of air introduced into a vehicle interior.

2. Discussion of Related Art

In general, air vents, through which air is discharged according to operations of an air conditioner and a heater, include a center air vent mounted on a center fascia panel between driver's seat and passenger's seat, side air vents mounted on crash pads on sides of the driver's seat and passenger's seat, or the like.

Each of the air vents is manufactured in a structure having a wide vertical width by adopting at least six or more horizontal and vertical wings.

Therefore, a size of the air vent is large, and thus, there are many disadvantages in packaging problems with surrounding parts and design constraints.

In particular, the conventional air vent as described above has a structure in which the plurality of horizontal wings and vertical wings are inevitably exposed.

For this reason, the air vent occupies a large mounting space in the center fascia panel or the crash pad, which eventually reduces a degree of design freedom for clusters and audio/video/navigation (AVN) devices arranged around the air vent.

Therefore, due to increases in sizes of the clusters and AVN devices mounted in the vehicle interior, an air vent mounting position tends to move to a lower region of the center fascia panel, and in particular, there is a trend that exterior design of the air vent is designed as a slim type.

Meanwhile, the air vent is largely divided into a manually operated air vent, which manually controls the direction and amount of air, and an electrically operated air vent that automatically controls the direction and amount of air using an actuator.

Unlike the electrically operated air vent, the manually operated air vent can intuitively control the wind direction and volume, but there is a problem in that the functions are not diverse.

Conversely, in the electrically operated air vent, it is possible to variously design the air vent according to a usage environment but has a problem of lower intuition compared to the manually operated air vent.

For the reasons described above, although a method for intuitively manipulating the air vent and diversifying the functions thereof has been sought in the field, satisfactory results have not been obtained so far.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a vehicle air vent structure including a vent duct having a front surface facing a vehicle interior and being open to form a discharge port configured to discharge air, a rear wing accommodated in a region of the discharge port and being rotatably coupled to the vent duct, a plurality of front wings disposed in a direction orthogonal to the rear wing behind the rear wing, a driving member mounted outside the vent duct and being coupled to the front wings to selectively rotate the front wings, and a spacer elongated in a width direction of the vent duct to rotate the plurality of front wings, wherein the front wings rotate together with the driving member, in response to a driving force being generated from the driving member and the front wings being manually rotatable, in response to the driving force being blocked from the driving member.

Each of the front wings may include a front body portion, a coupling protrusion protruding from an upper portion of the front body portion in a direction in which the driving member is disposed, a through groove formed in an upper portion of the coupling portion in the direction in which the driving member is disposed, the driving member passing through the through groove, and a wing hinge pressing member fixed at a position on the front body portion corresponding to the through groove, wherein a stepped portion configured to limit a rotation of each front wing is formed on an outer peripheral surface of the coupling protrusion.

The through groove and the wing hinge pressing member may be formed in a front wing, to which the driving member is coupled, from among the plurality of front wings.

The driving member may be coupled to any one of the plurality of front wings.

The driving member may include an actuator coupled to the front wing to rotate the front wing, in response to the driving force is generated, a fixed shaft extending from the actuator in a direction in which the front wing is disposed, and the fixed shaft being inserted into a shaft bush pressing the wing hinge pressing member.

The shaft bush may include a bush body portion forming a body, and a through protrusion passing through the wing hinge pressing member to pass through the through groove.

The spacer may include a coupling groove passing through the coupling protrusion, and a stopper formed on an inner peripheral surface of the coupling groove, the stopper being in contact with the stepped portion to limit the rotation of the front wing.

Each of the stepped portion and the stopper may be formed in a sectoral shape.

The stepped portion and the stopper may be disposed to be misaligned.

Each of the stepped portion and the stopper may be formed at 120°.

In another general aspect, there is provided a method of operating a vehicle air vent structure, including determining whether an automatic mode switch for operating an air vent is in an on state, operating the air vent in the automatic mode, in response to determining that the automatic mode switch is in the on state, determining whether a wing knob of the air vent is manually operated, and switching a mode of the air vent to a manual mode, in response to the wing knob of the air vent being determined to be manually operated.

The method may include maintaining the automatic mode of the air vent, in response to determining that the wing knob of the air vent is not manually operated.

The maintaining of the automatic mode of the air vent may include maintaining the automatic mode of the air vent by repeatedly operating an actuator and a front wing.

The method may include determining that the wing knob of the air vent is manually operated, in response to determining that the automatic mode switch is in an off state, and operating the air vent in the manual mode, in response to the wing knob of the air vent being manually operated.

The operating of the air vent in the manual mode may include stopping an actuator and manually operating a front wing.

In another general aspect, there is provided a method of operation a vehicle air vent structure, including determining whether an automatic mode switch for operating an air vent is in an on state, operating the air vent in the automatic mode, in response to determining that the automatic mode switch is in the on state, determining whether an electric mode switch for operating the air vent is an on state, and switching the air vent to the electric mode, in response to determining that the electric mode switch is in the on state.

The method may include determining whether a wing knob of the air vent is manually operated, in response to determining that the electric mode switch is in an off state, and switching a mode of the air vent to a manual mode, in response to determining that the wing knob of the air vent is manually operated.

The method may include maintaining the automatic mode of the air vent, in response to determining that the wing knob of the air vent is not manually operated.

The method may include determining whether the electric mode switch for operating the air vent is in the on state, in response to determining that the automatic mode switch is in an off state, and operating the air vent in the electric mode, in response to determining that the electric mode switch is in the on state.

The method may include determining whether the wing knob of the air vent is manually operated, in response to determining that the electric mode switch is in an off state, and operating the air vent in the manual mode, in response to determining that the wing knob of the air vent is manually operated.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 7 is a flowchart illustrating an operation method of the vehicle air vent structure according to one embodiment of the present invention;

FIG. 17 is a flowchart illustrating an operation method of the vehicle air vent structure according to still another embodiment of the present invention.

DETAILED DESCRIPTION OF EXEMPLARY EMBODIMENTS

Figure 1:
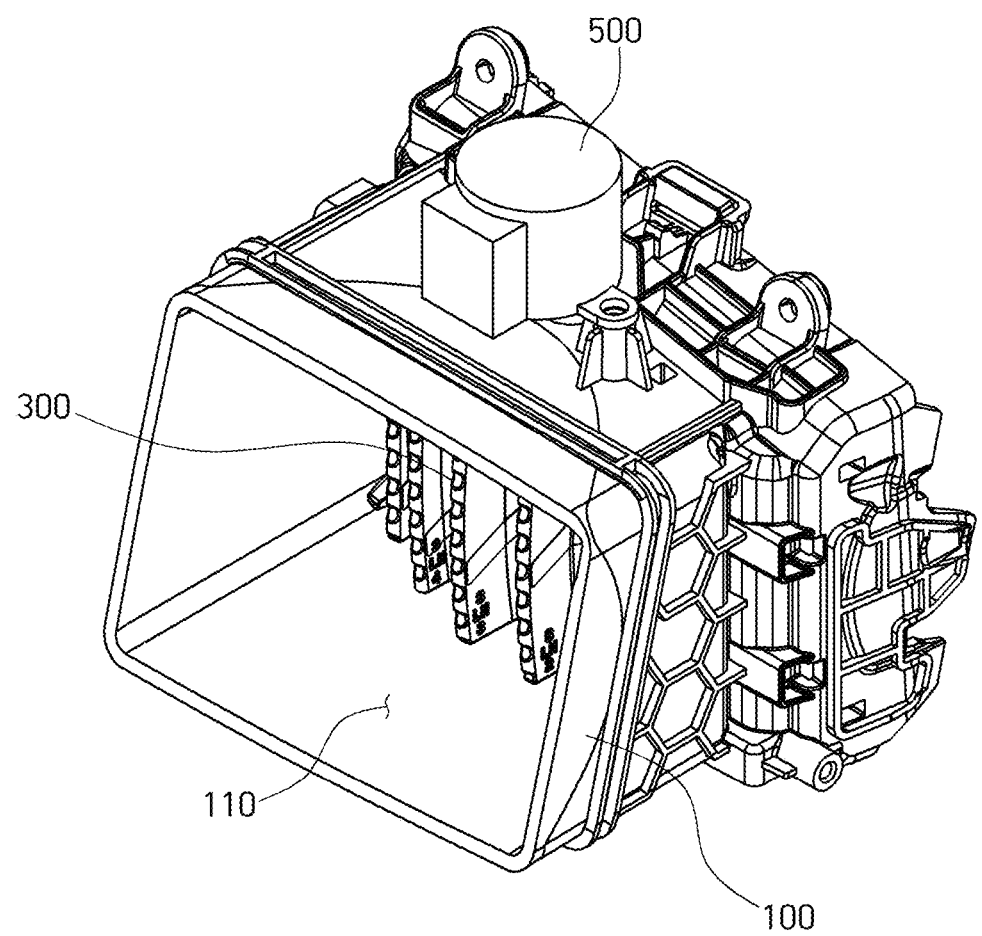
FIG. 1 is a perspective view illustrating a vehicle air vent structure according to one embodiment of the present invention.

Embodiments of the present invention are provided to more completely describe the present invention to those of ordinary skill in the art, and the following embodiments may be modified in several different forms, and a scope of the present invention is not limited to the following embodiments. Rather, the embodiments are provided so that the present invention will be more thorough and complete and will fully convey a spirit of the present invention to those skilled in the art. In addition, in the following drawings, each component is exaggerated for convenience and clarity of description, and the same reference numerals refer to the same elements in the drawings. As used herein, a term "and/or" includes any one and all combinations of one or more of those listed items.

The terminology used herein is used to describe specific embodiments, not to limit the present invention.

As used herein, a singular form may include the plural form unless the context clearly dictates otherwise. Also, as used herein, "comprise" and/or "comprising" refers to the presence of recited shapes, numbers, steps, operations, members, elements, and/or groups thereof and does not exclude the presence or addition of one or more other shapes, numbers, operations, members, elements and/or groups.

Hereinafter, exemplary embodiments of the present invention will be described in detail with reference to the accompanying drawings.

Figure 2:
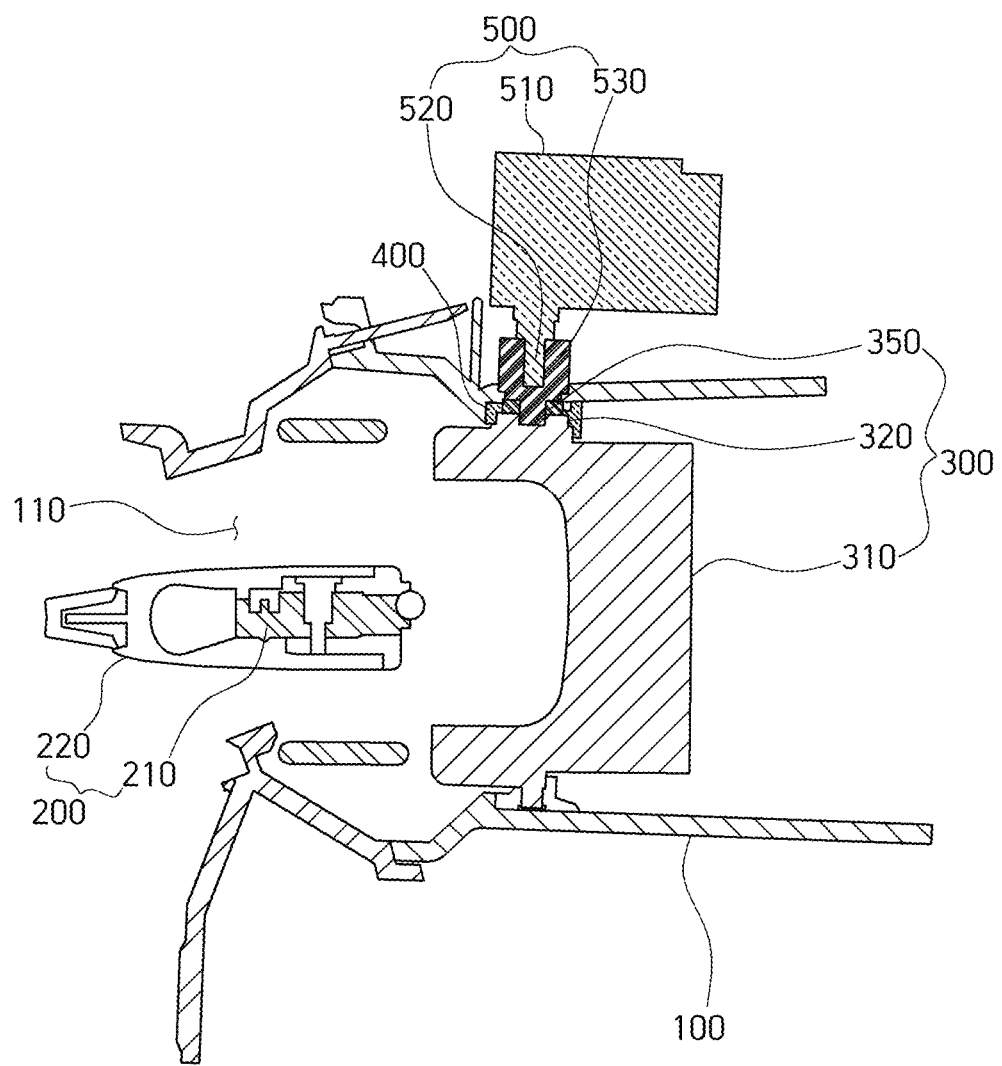
FIG. 2 is a cross-sectional view illustrating a cross section of the vehicle air vent structure according to one embodiment of the present invention.
Figure 3:
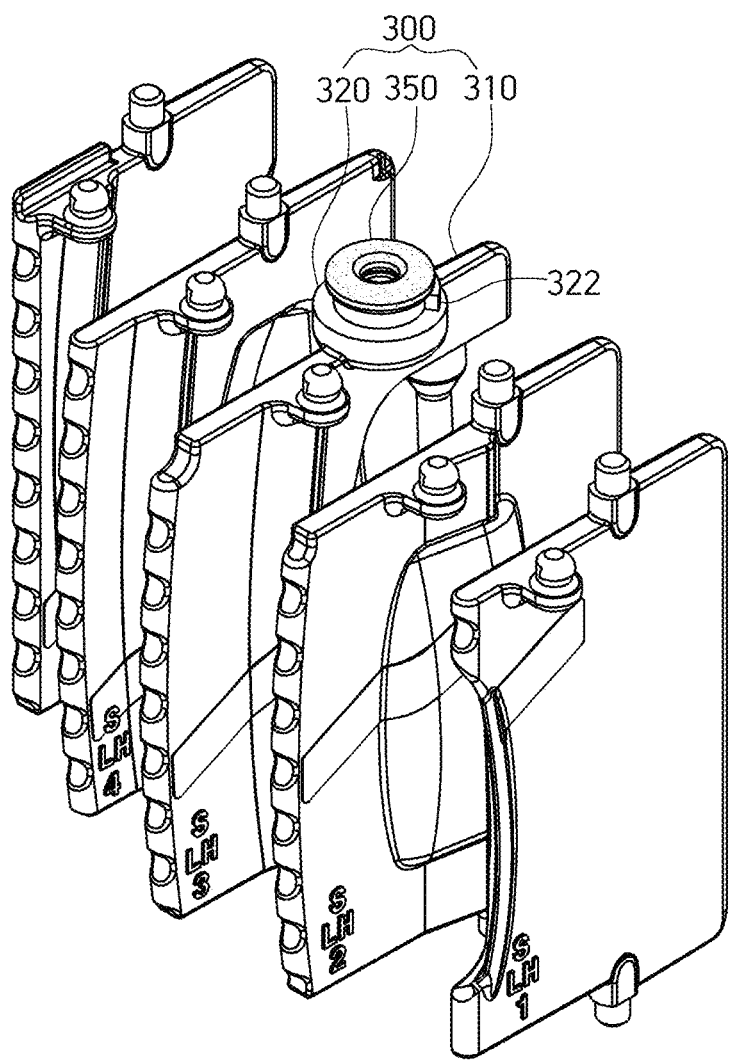
FIG. 3 is a perspective view illustrating a front wing according to one embodiment of the present invention.
Figure 4:
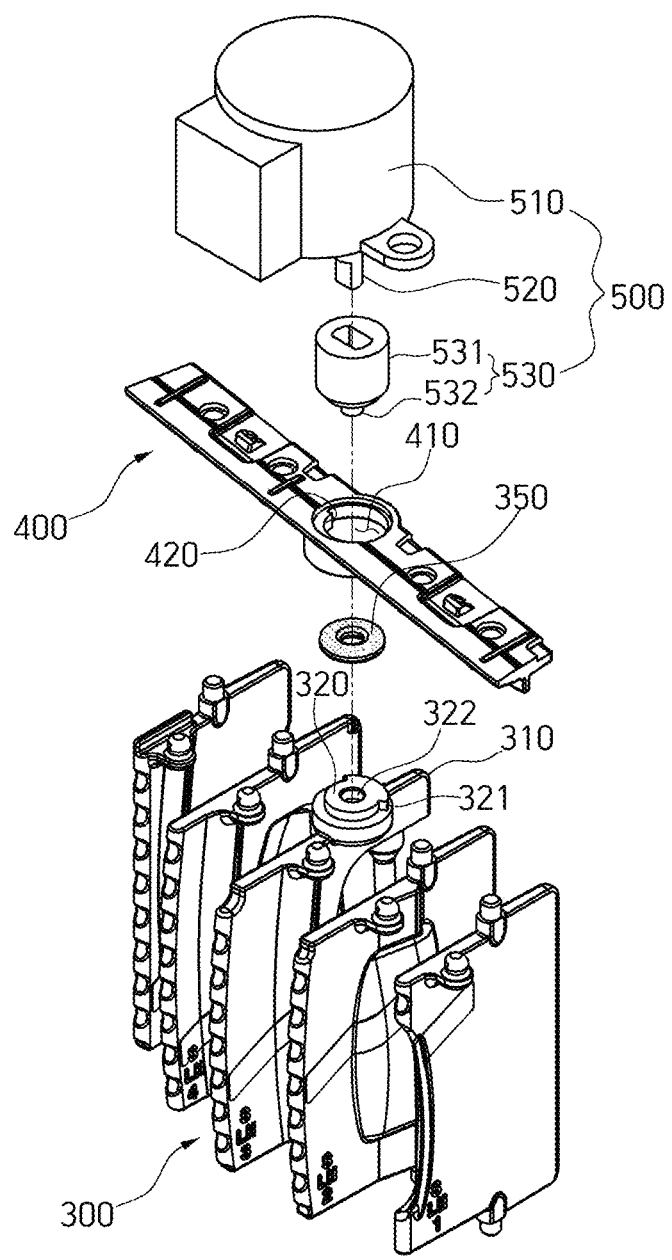
FIG. 4 is an exploded perspective view of a part of the vehicle air vent structure according to one embodiment of the present invention.
Figure 5:
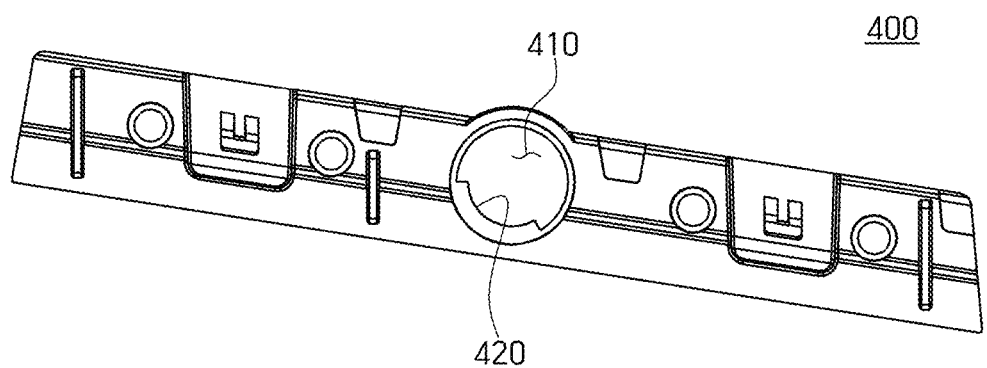
FIG. 5 is a plan view illustrating a front wing and a spacer according to one embodiment of the present invention.

FIG. 1 is a perspective view illustrating a vehicle air vent structure according to one embodiment of the present invention, FIG. 2 is a cross-sectional view illustrating a cross section of the vehicle air vent structure according to the embodiment of the present invention, FIG. 3 is a perspective view illustrating a front wing according to one embodiment of the present invention, FIG. 4 is an exploded perspective view of a part of the vehicle air vent structure according to one embodiment of the present invention, FIG. 5 is a plan view illustrating a front wing and a spacer according to one embodiment of the present invention, and FIGS. 6A to 6D are operational views illustrating an operation state of the front wing according to one embodiment of the present invention.

Referring to FIGS. 1 to 5 and 6A to 6D, the vehicle air vent structure according to the embodiment of the present invention includes a vent duct 100, a rear wing 200, a front wing 300, a driving member 500, and a spacer 400.

The vent duct 100 forms a body of the air vent and preferably has a quadrangular frame shape and is connected to air conditioners located therebehind.

In addition, in the vent duct 100, a discharge port 110, through which air generated from the air conditioners is discharged into a vehicle interior, is formed at a front surface of the vent duct 100 that faces the vehicle interior.

The discharge port 110 has a shape that is widened so that an area thereof increases in a direction toward the vehicle interior.

Meanwhile, the vent duct 100 is preferably fixed to a crush pad of the vehicle.

The rear wing 200 is accommodated in a region of the discharge port 110 of the vent duct 100, is elongated in a width direction of the vent duct 100, and is rotatably coupled to the vent duct 100.

Meanwhile, the vehicle air vent of the present invention is applied to a slim air vent, and one rear wing 200 is preferably disposed inside the vent duct 100.

Accordingly, in the present invention, it is possible to effectively secure a degree of design freedom for clusters and audio/video/navigation (AVN) devices arranged around the air vent.

The rear wing 200 includes a rear body portion 210 and a wing knob 220.

The rear body portion 210 forms a body of the rear wing 200 and is exposed to the outside from the discharge port 110.

In addition, the wing knob 220 is coupled to a center portion of the rear body portion 210, and thus, the wing knob 220 is rotated according to control of the wing knob 220.

The wing knob 220 is coupled to the rear body portion 210 and a front body portion 310 of the front wing 300 and controls a direction of a wind discharged from the discharge port 110.

Specifically, the wing knob 220 may control a right-left rotation of the front wing 300 and may control an up-down rotation of the rear wing 200.

That is, the wing knob 220 can easily control the direction of the air discharged from the discharge port 110 of the vent duct 100.

The front wing 300 includes a plurality of wings, is disposed behind the rear wing 200, and is disposed to extend in a direction perpendicular to the rear wing 200, that is, in a height direction of the vent duct 100.

In addition, as illustrated in FIG. 1, the plurality of front wings 300 are spaced apart from each other by a distance in a width direction of the vent duct 100, and each of the front wings 300 is rotatably coupled to the vent duct 100.

In addition, when an operation mode of the air vent is an electric mode, the front wing 300 rotates only once at a preset angle according to the operation of the driving member 500, and when the operation mode is an automatic mode, the front wing 300 rotates repeatedly at a preset angle according to the operation of the driving member 500. Moreover, when the operation mode is a manual mode, a passenger in the vehicle holds a knob and moves the knob in a lateral direction to control the rotation of the front wing 300.

The front wing 300 includes a front body portion 310, a coupling protrusion 320, and a wing hinge pressing member 350.

The front body portion 310 forms a body of the front wing 300, and a plurality of front body portions are disposed to be spaced apart from each other by a distance in the width direction of the vent duct 100.

The coupling protrusion 320 passes through upper and lower surfaces of the vent duct 100 and rotatably passes through the spacer 400 disposed on an upper surface of the vent duct 100.

Moreover, the driving member 500 is rotatably coupled to the coupling protrusion 320.

Accordingly, the front wing 300 is connected to the driving member 500 through the coupling protrusion 320 and may rotate at a preset angle according to driving of the driving member 500 when the operation mode of the air vent is the electric mode or the automatic mode.

A stepped portion 321 and a through groove 322 are formed at the coupling protrusion 320.

The stepped portion 321 protrudes from an outer peripheral surface of the coupling protrusion 320 and limits excessive rotation of the front wing 300 by the spacer 400 to be described below.

The stepped portion 321 is formed in a sectoral shape and is formed at an angle of about 120° from one end to the other end.

The through groove 322 is formed in an upper portion of the coupling protrusion 320 in a direction in which the driving member 500 is disposed, and the driving member 500 passes therethrough.

The wing hinge pressing member 350 is fixed to a position corresponding to the through groove 322 in the front body portion 310, that is, the upper surface of the coupling protrusion 320.

In addition, the wing hinge pressing member 350 is preferably formed in a donut shape so that a shaft bush 530 of the fixed driving member 500 passes through an inner peripheral surface of the wing hinge pressing member 350.

The wing hinge pressing member 350 is made of an elastic material such as rubber.

Meanwhile, the through groove 322 formed in the coupling protrusion 320 and the wing hinge pressing member 350 fixed to the upper surface of the coupling protrusion 320 are formed in the front wing 300, to which the driving member 500 is coupled, among the plurality of front wings 300.

The driving member 500 is mounted outside the vent duct 100 and selectively rotates the front wing 300 as external power is applied.

Moreover, the driving member 500 is coupled to any one of the plurality of front wings 300.

The driving member 500 includes an actuator 510, a fixed shaft 520, and the shaft bush 530.

The actuator 510 is mounted outside the vent duct 100 and is connected to the front body portion 310 of the front wing 300 to rotate the front body portion 310 of the front wing 300 when a driving force is generated.

The fixed shaft 520 has a cylindrical shape and extends from the actuator 510 in a direction in which the front wing 300 is disposed.

The fixed shaft 520 is inserted into the shaft bush 530, and the shaft bush 530 passes through the wing hinge pressing member 350 and is rotatably coupled to the through groove 322 of the front wing 300.

That is, the shaft bush 530 rotates together with the actuator 510.

Then, the shaft bush 530 passes through the wing hinge pressing member 350.

To this end, the shaft bush 530 includes a bush body portion 531 and a through protrusion 532.

The bush body portion 531 forms a body of the shaft bush 530 and preferably has a cylindrical shape.

Moreover, the bush body portion 531 has a circumference larger than the circumference of the wing hinge pressing member 350.

Accordingly, when the shaft bush 530 passes through the wing hinge pressing member 350 and is coupled to the through groove 322 of the front wing 300, a lower surface of the bush body portion 531 can easily be in contact with the upper surface of the wing hinge pressing member 350.

The through protrusion 532 extends from the bush body portion 531 in the direction in which the front wing 300 is disposed and preferably has a cylindrical shape.

In addition, the through protrusion 532 is the same size as the inner peripheral surface of the wing hinge pressing member 350 of which the circumference is formed in a donut shape.

Accordingly, when the shaft bush 530 passes through the wing hinge pressing member 350 and is coupled to the through groove 322 of the front wing 300, the through protrusion 532 can easily pass through the wing hinge pressing member 350.

Meanwhile, when the operation mode of the air vent is the electric mode or the automatic mode, the wing hinge pressing member 350 made of an elastic material rotates together with the wing hinge pressing member 350 in contact with the lower surface of the shaft bush 530 while the shaft bush 530 rotates.

Accordingly, the front wing 300 forming the coupling protrusion 320, to which the wing hinge pressing member 350 is fixed, also rotates together.

However, in a case where the operation mode of the air vent is the manual mode, when the passenger holds and moves the knob laterally, a rotational force greater than a friction force between the lower surface of the shaft bush 530 and the wing hinge pressing member 350 is generated, and thus, the front wing 300 rotates independently of the driving member 500.

Accordingly, when the driving force is generated from the actuator 510 of the driving member 500, the front wing 300 rotates together with the actuator 510 of the driving member 500, and when the driving force is blocked from the actuator 510 of the driving member 500, the front wing 300 may be rotated in the manual mode.

The spacer 400 is elongated in the width direction of the vent duct 100 and is rotatably fixed to the upper surface of the front wing 300.

The spacer 400 includes a coupling groove 410 and a stopper 420.

The coupling groove 410 is provided as a plurality of coupling grooves 410, and the plurality of coupling grooves 410 are spaced apart from each other by a distance in the width direction of the vent duct 100 in the spacer 400.

In addition, the coupling protrusion 320 of the front wing 300 passes through the coupling groove 410.

That is, the coupling protrusions 320 formed on the upper surfaces of the plurality of front wings 300 are rotatably coupled to the plurality of coupling grooves 410.

Moreover, any one of the plurality of front wings 300 is coupled to the driving member 500.

That is, the coupling protrusions 320 formed on the upper surface of the plurality of front wings 300 are rotatably fixed to the coupling grooves 410, and thus, the plurality of front wings 300 are connected together to the spacer 400. Therefore, when the front wing 300 connected to the fixed driving member 500 among the plurality of the front wing 300 rotates according to the driving of the driving member 500, the spacer 400 rotates the remaining front wings 300 at a preset angle while performing a linear motion.

Accordingly, the spacer 400 may easily rotate the plurality of front wings 300 to adjust a wind direction of the air.

The stopper 420 is formed on an inner peripheral surface of the coupling groove 410 and is in contact with the stepped portion 321 of the front wing 300 to limit the rotation of the front wing 300.

This stopper 420 is formed in a sector shape and formed at an angle of about 120° from one end to the other end.

In addition, the stopper 420 and the stepped portion 321 are alternately arranged so that the stopper 420 and the stepped portion 321 do not overlap each other when the spacer 400 is coupled to the front wing 300 and the coupling protrusion 320 of the front wing 300 is coupled to the coupling groove 410 of the spacer 400.

Accordingly, the spacer 400 may be easily coupled to the front wing 300, and the spacer 400 may limit rotation of the front wing 300.

For example, when the front wing 300 rotates 30° counterclockwise based on a standard state in which the front wing 300 is fully opened to face the front of the vehicle interior, the front wing 300 is in a rightward state in which the wind direction is directed toward the right in the vehicle interior.

In this case, when the front wing 300 is in the rightward state, one end of the stopper 420 formed on the spacer 400 and one end of the stepped portion 321 formed on the front wing 300 are in contact with each other so that the front wing 300 is prevented from excessively rotating in the counterclockwise direction.

Figure 6A:
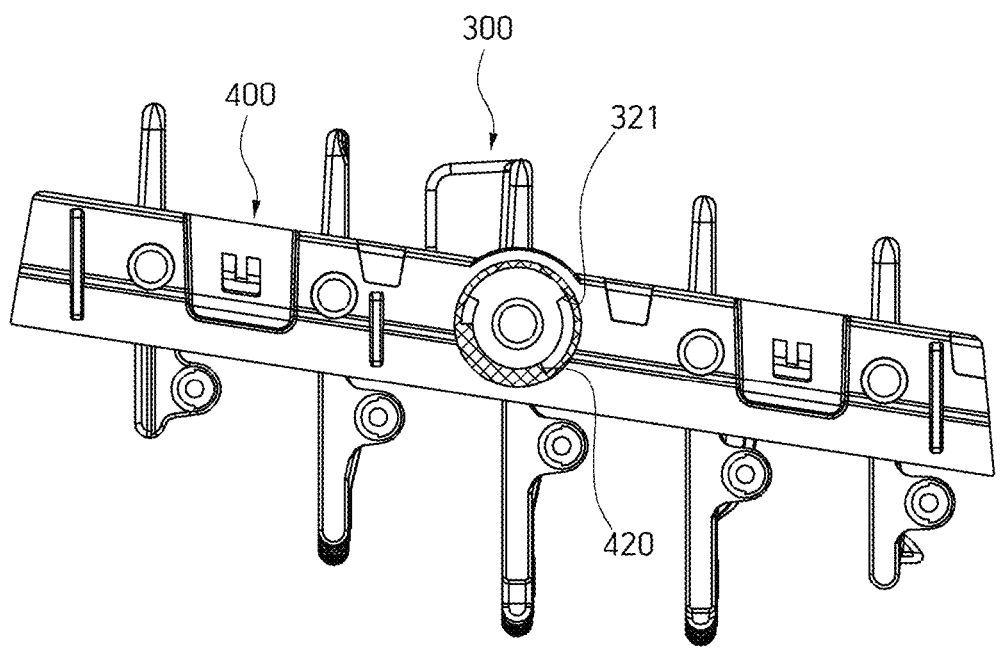
FIGS. 6A to 6D are operational views illustrating an operation state of the front wing according to one embodiment of the present invention.
Figure 6B:
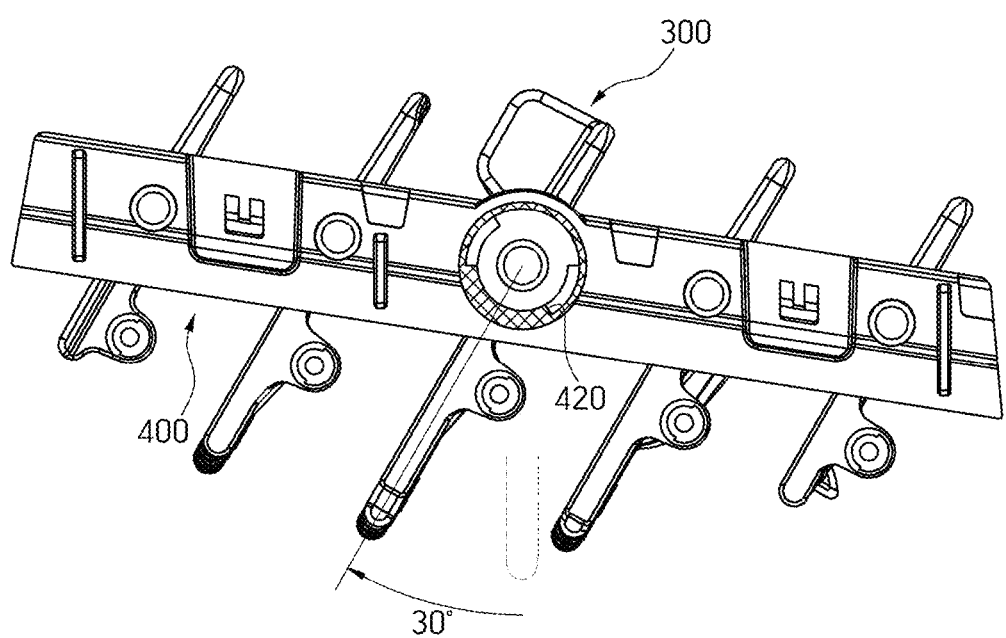

When the front wing 300 rotates 30° in the clockwise direction, as illustrated in FIG. 6B, from the standard state, as illustrated in FIG. 6A, the front wing 300 is in a leftward state in which the wind direction is directed toward the left in the vehicle interior.

Figure 6C:
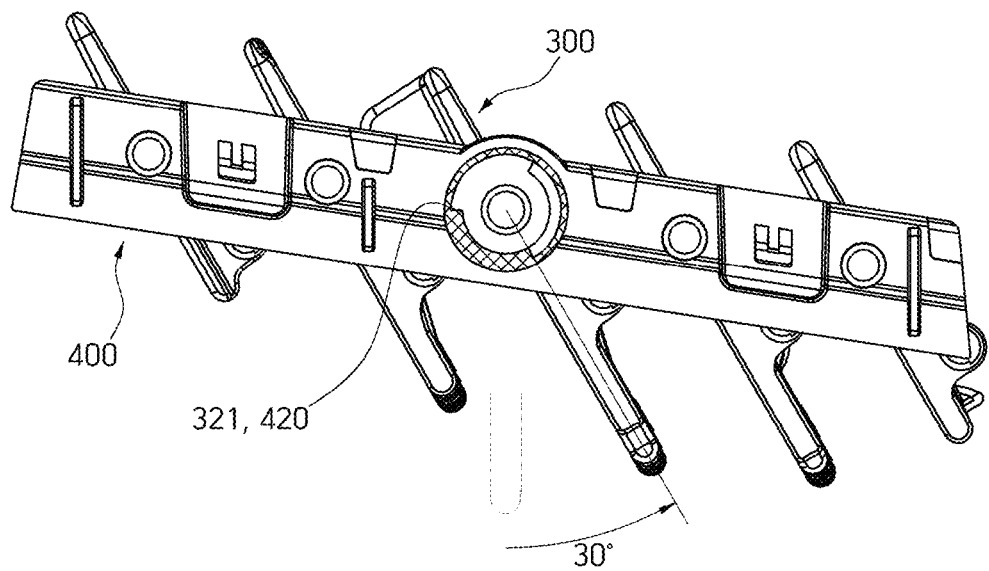

Moreover, when the front wing 300 rotates 30° in the counterclockwise direction, as illustrated in FIG. 6C, the front wing 300 is in the rightward state in which the wind direction is directed toward the right side of the vehicle interior.

In this case, the stopper 420 and the stepped portion 321 are not in contact with each other.

Figure 6D:
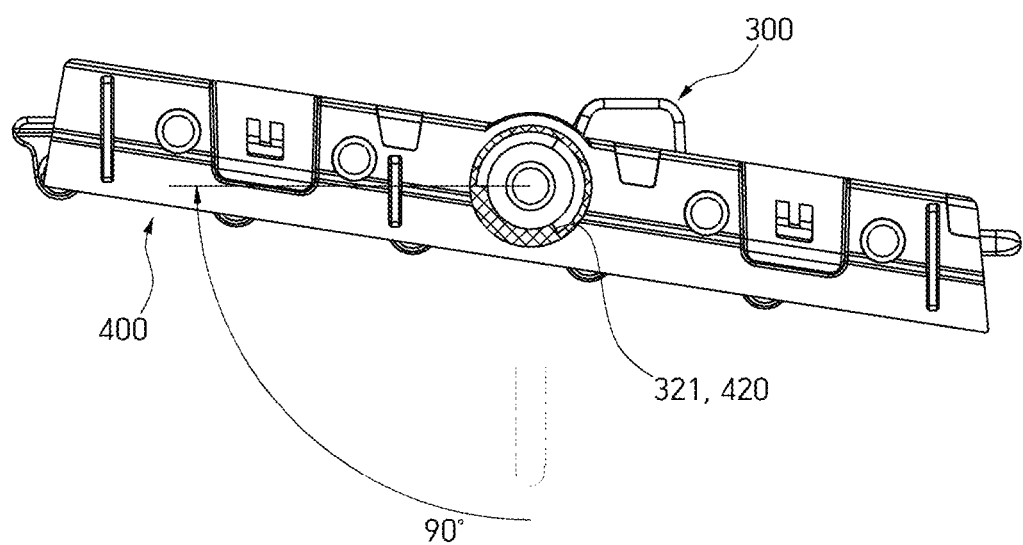

When the front wing 300 rotates 90° in the clockwise direction, as illustrated in FIG. 6D, from the standard state, that is, when the front wing 300 further rotates by 30° from the leftward state, the front wing 300 blocks the discharge port 110 of the vent duct 100, and thus, the air vent is closed.

Accordingly, in the present invention, it is possible to easily limit the rotation angle of the front wing 300 by the stepped portion 321 of the front wing 300 and the stopper 420 of the spacer 400.

Hereinafter, the operation method of a vehicle air vent structure according to the embodiment of the present invention will be described in detail with reference to the accompanying drawings.

FIG. 7 is a flowchart illustrating the operation method of the vehicle air vent structure according to the embodiment of the present invention.

Meanwhile, in the modes of the air vent to be described below, the automatic mode refers to a mode in which the front wing 300 repeatedly moves laterally according to the operation of the actuator 510 of the driving motor.

Moreover, the manual mode refers to a mode in which the passenger in the vehicle holds the wing knob 220 and directly moves the wing knob 220 laterally.

First, referring to FIG. 7, it is determined whether an automatic mode switch for operating the air vent in the automatic mode is in an on state (S110).

Moreover, when the automatic mode switch is in the on state in operation S110 in which whether the automatic mode switch is in the on state is determined, the air vent is operated in the automatic mode (S120).

Then, it is determined whether the wing knob 220 of the air vent is manually operated (S130).

When the wing knob 220 of the air vent is manually operated in operation S130 in which whether the wing knob 220 of the air vent is manually operated is determined, the mode of the air vent is switched to the manual mode (S140).

Meanwhile, when the wing knob 220 of the air vent is not manually operated in operation S130 in which whether the wing knob 220 of the air vent is manually operated is determined, the air vent maintains the automatic mode (S131).

Meanwhile, in operation S131 in which the air vent is maintained in the automatic mode, the actuator 510 of the driving motor is operated so that the front wing 300 repeatedly operates in the lateral direction.

Meanwhile, when the automatic mode switch is in an off state in operation S110 in which whether the automatic mode switch is in the on state is determined, it is determined whether the wing knob 220 of the air vent is manually operated (S111).

Moreover, when the wing knob 220 of the air vent is manually operated, the air vent is operated in the manual mode (S170).

Meanwhile, in operation S170 in which the air vent is operated in the manual mode, the actuator 510 is stopped, and the front wing 300 is manually operated.

Meanwhile, the front wing 300 repeatedly moves in the lateral direction in the automatic mode. However, in another embodiment of the present invention, the front wing 300 may be operated in the electric mode.

Here, the electric mode refers to a mode in which the front wing 300 moves only once in one of the left and right directions according to the operation of the actuator 510 of the driving motor.

Hereinafter, an operation method of a vehicle air vent structure according to another embodiment of the present invention will be described in detail with reference to the accompanying drawings.

Figure 8:
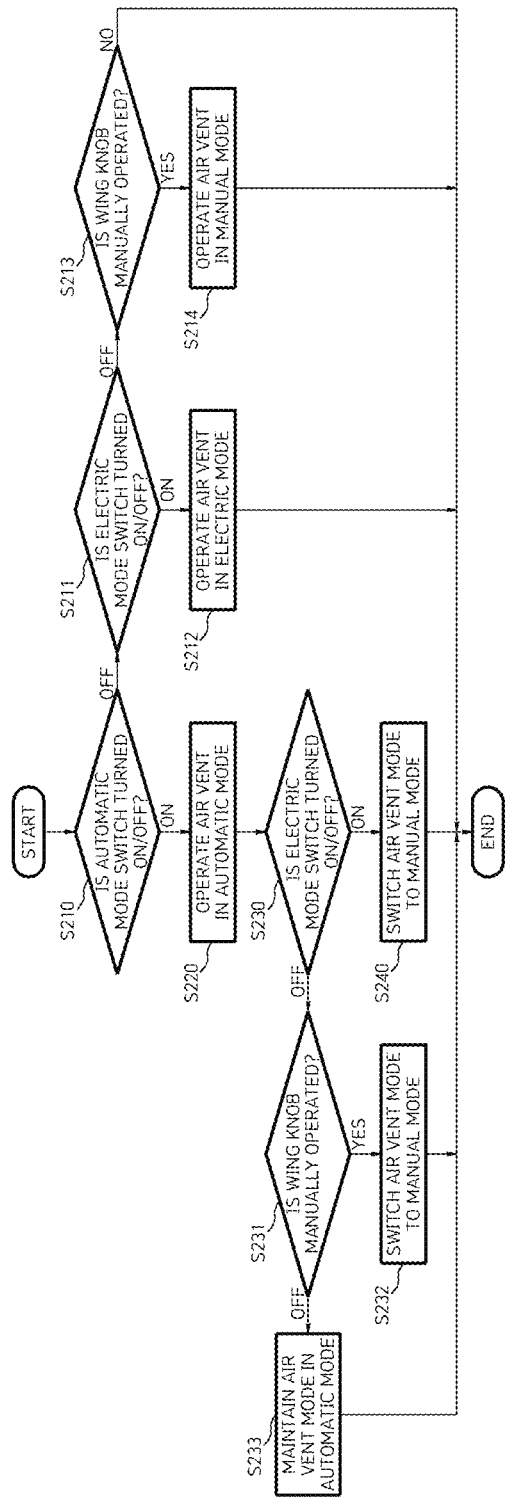
FIG. 8 is a flowchart illustrating an operation method of a vehicle air vent structure according to another embodiment of the present invention.

FIG. 8 is a sequence illustrating the operation method of the vehicle air vent structure according to another embodiment of the present invention.

Referring to FIG. 8, it is determined whether the automatic mode switch for operating the air vent in the automatic mode is in an on state (S210).

When the automatic mode switch is in the on state in operation S210 in which whether the automatic mode switch is in the on state is determined, the mode of the air vent is operated in the automatic mode (S220).

Then, it is determined whether an electric mode switch for operating the air vent in the electric mode is in an on state (S230).

When the electric mode switch is in the on state in operation S230 in which whether the electric mode switch is in the on state is determined, the air vent is switched to the electric mode (S240).

Meanwhile, in operation S240 in which the mode of the air vent is switched to the electric mode, the actuator 510 of the driving motor operates so that the front wing 300 operates only once in one of the left and right directions.

Meanwhile, when the electric mode switch is in an off state in operation S230 in which whether the electric mode switch is in the on state is determined, it is determined whether the wing knob 220 of the air vent is manually operated (S231).

When the wing knob 220 of the air vent is manually operated in operation S231 in which whether the wing knob 220 of the air vent is manually operated is determined, the mode of the air vent is switched to the manual mode (S232).

Meanwhile, when the wing knob 220 of the air vent is not manually operated in operation S231 in which whether the wing knob 220 of the air vent is manually operated is determined, the mode of the air vent is maintained in the automatic mode (S233).

Meanwhile, when the automatic mode switch is in the off state in operation S210 in which whether the automatic mode switch is in the on state is determined, it is determined whether the electric mode switch for operating the air vent in the electric mode is in the on state (S211).

Moreover, when the electric mode switch is in the on state in operation S211 in which whether the electric mode switch is in the on state is determined, the air vent is operated in the electric mode (S212).

Meanwhile, when the electric mode switch is in the off state in operation S211 in which whether the electric mode switch is in the on state is determined, it is determined whether the wing knob 220 of the air vent is manually operated (S213).

Moreover, when the wing knob 220 of the air vent is manually operated in operation S213 in which whether the wing knob 220 of the air vent is manually operated is determined, the air vent is operated in the manual mode (S214).

Therefore, the present invention may use the automatic mode, the electric mode, and the manual mode at the same time as the operation mode of the air vent.

As described above, in the vehicle air vent structure and the operation method thereof according to the embodiment of the present invention, it is possible to intuitively operate the wind direction and the air volume discharged from the air vent, and it is possible to design various functions according to the use environment.

Meanwhile, the vehicle air vent structure according to another embodiment of the present invention may detect the rotation of the air vent through a rotation detection sensor 600'.

Hereinafter, another embodiment of the vehicle air vent structure of the present invention will be described in detail with reference to the accompanying drawings.

Figure 9:
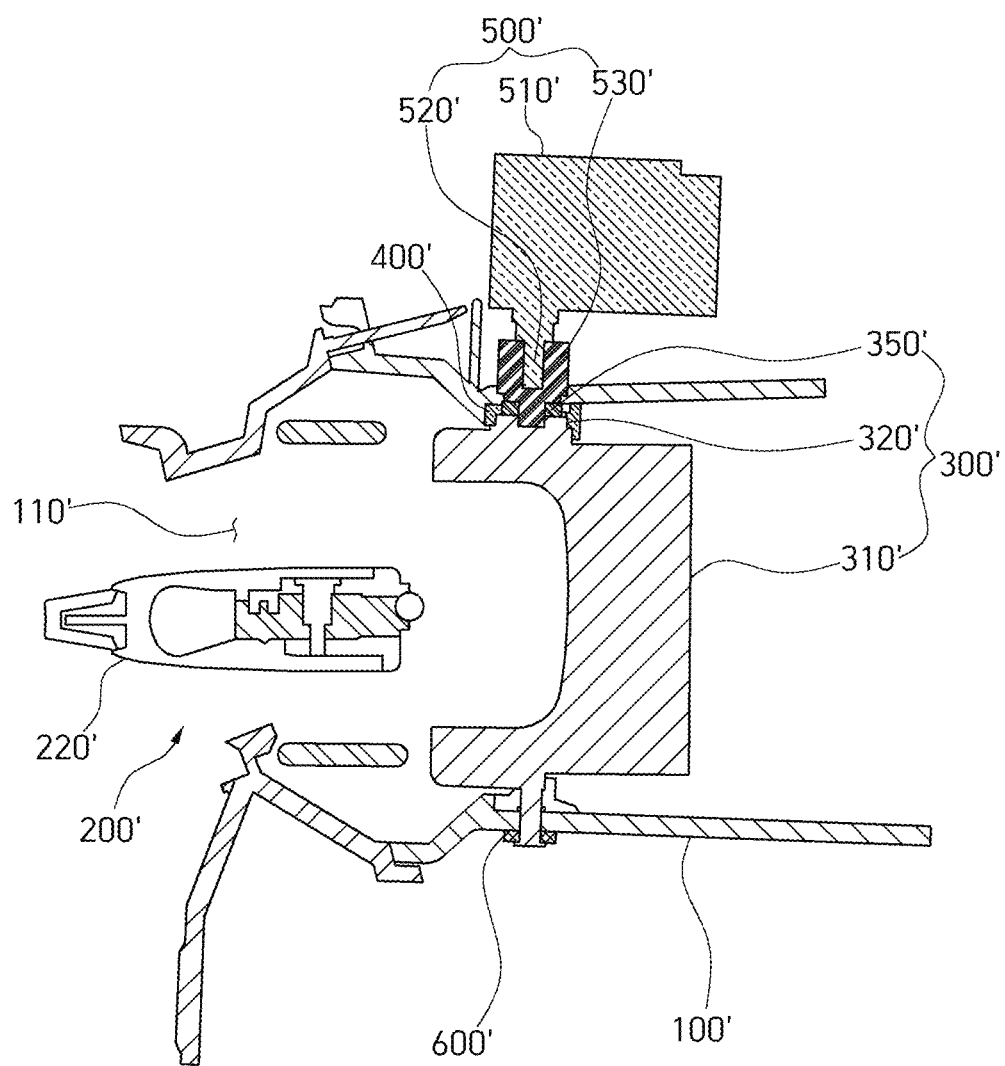
FIG. 9 is a cross-sectional view illustrating a cross section of the vehicle air vent structure according to another embodiment of the present invention.
Figure 10:
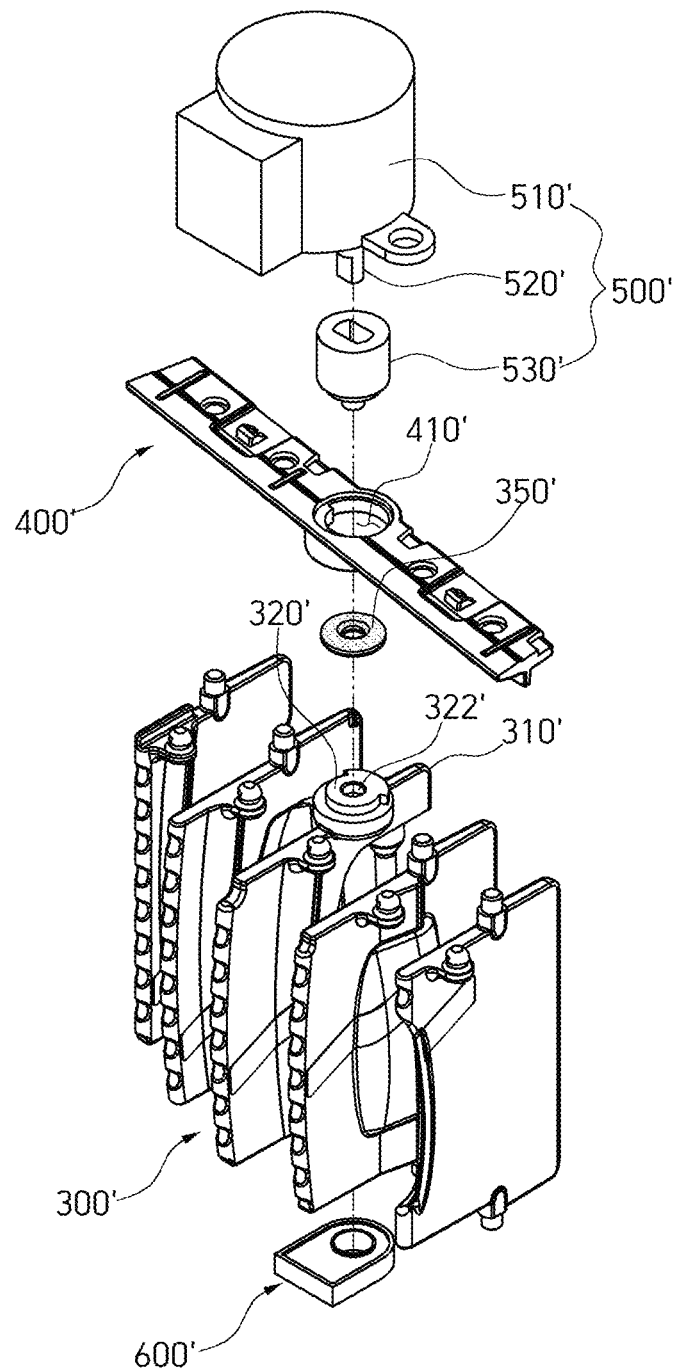
FIG. 10 is an exploded perspective view of a part of the vehicle air vent structure according to another embodiment of the present invention.

FIG. 9 is a cross-sectional view illustrating a cross-section of the vehicle air vent structure according to another embodiment of the present invention, and FIG. 10 is an exploded perspective view of a part of the vehicle air vent structure according to another embodiment of the present invention.

Referring to FIGS. 9 to 10 and 11A to 11C, the vehicle air vent structure according to another embodiment of the present invention includes a vent duct 100', a rear wing 200', a front wing 300', a spacer 400', a driving member 500', and a rotation detection sensor 600'.

The vent duct 100' forms a body of the air vent, preferably has a quadrangular frame shape, and is connected to air conditioners located therebehind. In the vent duct 100', a discharge port 110' through which air generated from the air conditioners is discharged into a vehicle interior is formed at a front surface of the vent duct 100' that faces the vehicle interior.

The vent duct 100' is preferably fixed to a crush pad of the vehicle.

The rear wing 200' is accommodated in a region of the discharge port 110' of the vent duct 100', is elongated in a width direction of the vent duct 100', and is rotatably coupled to the vent duct 100'.

The front wing 300' includes a plurality of wings, is disposed behind the rear wing 200', and is disposed to extend in a direction perpendicular to the rear wing 200', that is, in a height direction of the vent duct 100'. Moreover, the plurality of front wings 300' are spaced apart from each other by a distance in a width direction of the vent duct 100', and each of the front wings 300' is rotatably coupled to the vent duct 100'.

In addition, when an operation mode of the air vent is an electric mode, the front wing 300' rotates only once at a preset angle according to the operation of the driving member 500', and when the operation mode is an automatic mode, the front wing 300' repeatedly rotates at a preset angle according to the operation of the driving member 500'. Moreover, when the operation mode is a manual mode, a passenger in the vehicle holds a knob and moves the knob in the lateral direction to control the rotation of the front wing 300'.

The front wing 300' includes a front body portion 310', a coupling protrusion 320', and a wing hinge pressing member 350'.

The front body portion 310' forms a body of the front wing 300', and a plurality of front body portions are disposed to be spaced apart from each other by a distance in the width direction of the vent duct 100'.

The coupling protrusion 320' passes through upper and lower surfaces of the vent duct 100', the driving member 500' disposed on the upper surface of the vent duct 100' is rotatably coupled, and the rotation detection sensor 600' disposed on the lower surface of the vent duct 100' is coupled.

Accordingly, the front wing 300' is connected to the driving member 500' through the coupling protrusion 320' and may rotate at a preset angle according to driving of the driving member 500' when the operation mode of the air vent is the electric mode or the automatic mode.

The wing hinge pressing member 350' is fixed to a position corresponding to the through groove 322' in the front body portion 310', that is, the upper surface of the coupling protrusion 320'. Moreover, the wing hinge pressing member 350' is preferably formed in a donut shape so that a shaft bush 530' of the fixed driving member 500' passes through an inner peripheral surface of the wing hinge pressing member 350'.

The wing hinge pressing member 350' is made of an elastic material such as rubber.

The spacer 400' is elongated in the width direction of the vent duct 100' and is rotatably fixed to the upper surface of the front wing 300'.

To this end, a coupling groove 410' is formed in the spacer 400'.

The coupling groove 410' is provided as a plurality of coupling grooves 410', and the plurality of coupling grooves 410' are spaced apart from each other by a distance in the width direction of the vent duct 100' in the spacer 400'. Moreover, the coupling protrusion 320' of the front wing 300' passes through the coupling groove 410'.

That is, the coupling protrusions 320' formed on the upper surfaces of the plurality of front wings 300' are rotatably coupled to the plurality of coupling grooves 410'.

Moreover, any one of the plurality of front wings 300' is coupled to the driving member 500'.

That is, the coupling protrusions 320' formed on the upper surface of the plurality of front wings 300' are rotatably fixed to the coupling grooves 410', and thus, the plurality of front wings 300' are connected together to the spacer 400'. Therefore, when the front wing 300' connected to the fixed driving member 500' among the plurality of front wings 300' rotates according to the driving of the driving member 500', the spacer 400' rotates the remaining front wings 300' at a preset angle while performing a linear motion.

Accordingly, the spacer 400' may easily rotate the plurality of front wings 300' to adjust a wind direction of the air.

The driving member 500' is mounted outside the vent duct 100' and selectively rotates the front body portion 310' of the front wing 300' depending on whether external power is applied to generate a driving force.

In addition, the driving member 500' is coupled to any one of the plurality of front wings 300'.

The driving member 500' includes an actuator 510', a fixed shaft 520', and the shaft bush 530'.

In addition, the driving member 500' may include the actuator 510' having a step motor function.

The actuator 510' preferably has a step motor function and is mounted outside the vent duct 100'.

Moreover, the actuator 510' is connected to the front body portion 310' of the front wing 300' to rotate the front body portion 310' of the front wing 300' when a driving force is generated.

The fixed shaft 520' has a cylindrical shape and extends from the actuator 510' in a direction in which the front wing 300' is disposed.

The fixed shaft 520' is inserted into the shaft bush 530', and the shaft bush 530' passes through the wing hinge pressing member 350' and is rotatably coupled to the through groove 322' of the front wing 300'.

Then, the shaft bush 530' rotates together with the actuator 510' and passes through the wing hinge pressing member 350'.

Meanwhile, when the operation mode of the air vent is the electric mode or the automatic mode, the wing hinge pressing member 350' made of an elastic material rotates together with the wing hinge pressing member 350' in contact with the lower surface of the shaft bush 530' while the shaft bush 530' rotates.

Accordingly, the front wing 300' forming the coupling protrusion 320', to which the wing hinge pressing member 350' is fixed, also rotates together.

However, in a case where the operation mode of the air vent is the manual mode, when the passenger holds and moves the knob laterally, a rotational force greater than a friction force between the lower surface of the shaft bush 530' and the wing hinge pressing member 350' is generated, and thus, the front wing 300' rotates independently of the driving member 500'.

Accordingly, when the driving force is generated from the actuator 510' of the driving member 500', the front wing 300' rotates together with the actuator 510' of the driving member 500', and when the driving force is blocked from the actuator 510' of the driving member 500', the front wing 300' may be rotated in the manual mode.

The rotation detection sensor 600' is disposed outside the vent duct 100', specifically, a lower portion in the opposite direction to an upper portion where the driving member 500' is disposed in the vent duct 100'.

In addition, the rotation detection sensor 600' is coupled to the coupling protrusion 320' of the front wing 300' to detect a rotation angle of the front wing 300'.

This rotation detection sensor 600' is coupled to any one of the plurality of front wings 300', specifically, the rotation detection sensor 600' is preferably coupled to the front wing 300', to which the driving member 500' is coupled, among the plurality of front wings 300'.

Due to this, the rotation detection sensor 600' can easily detect the rotation angle of the front wing 300'.

Hereinafter, the operation method of the vehicle air vent structure according to another embodiment of the present invention will be described in detail with reference to the accompanying drawings.

Figure 11A:
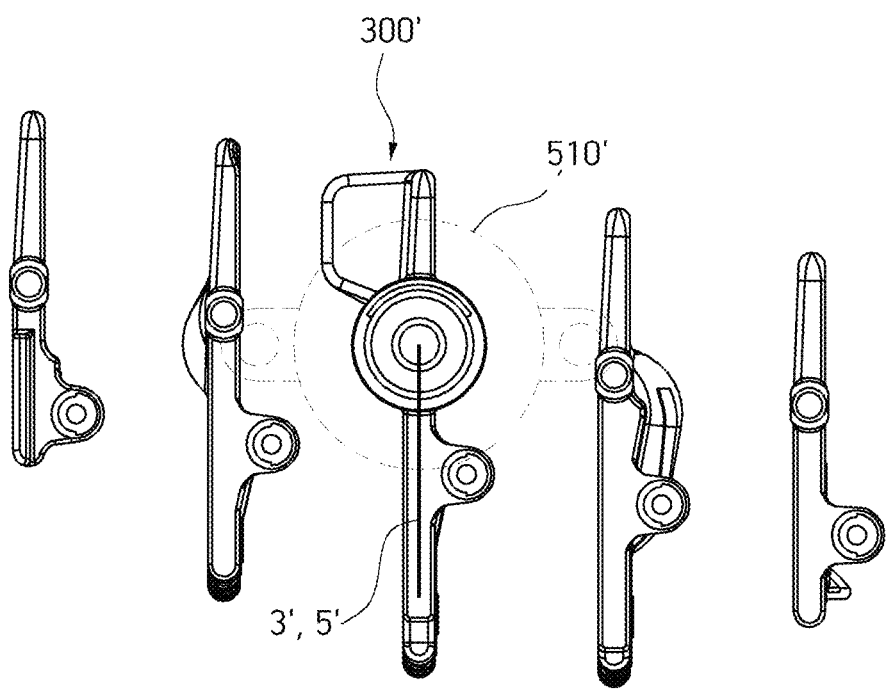
FIGS. 11A to 11C are operational views illustrating an operation state of a front wing according to another embodiment of the present invention.
Figure 11B:
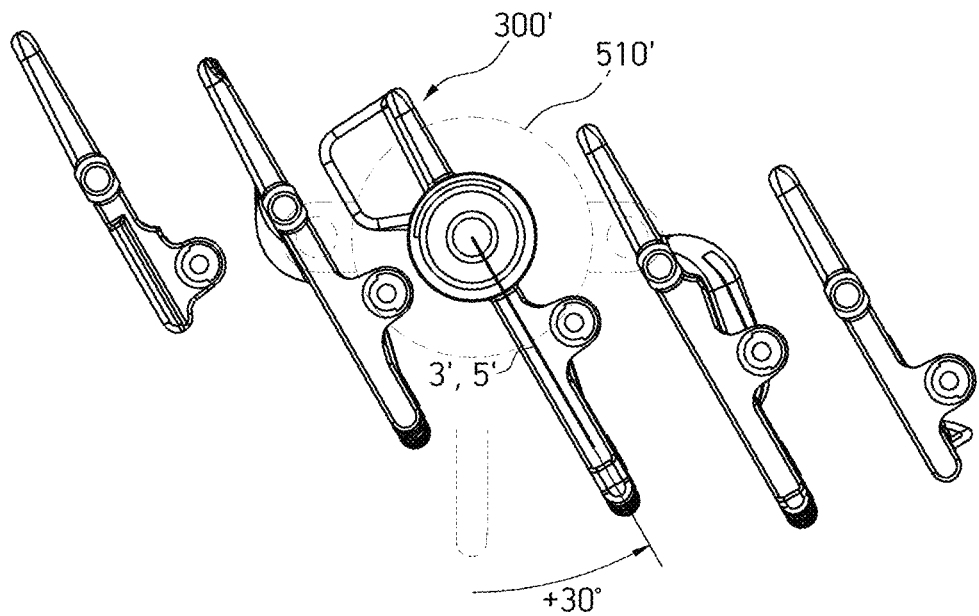
Figure 11C:
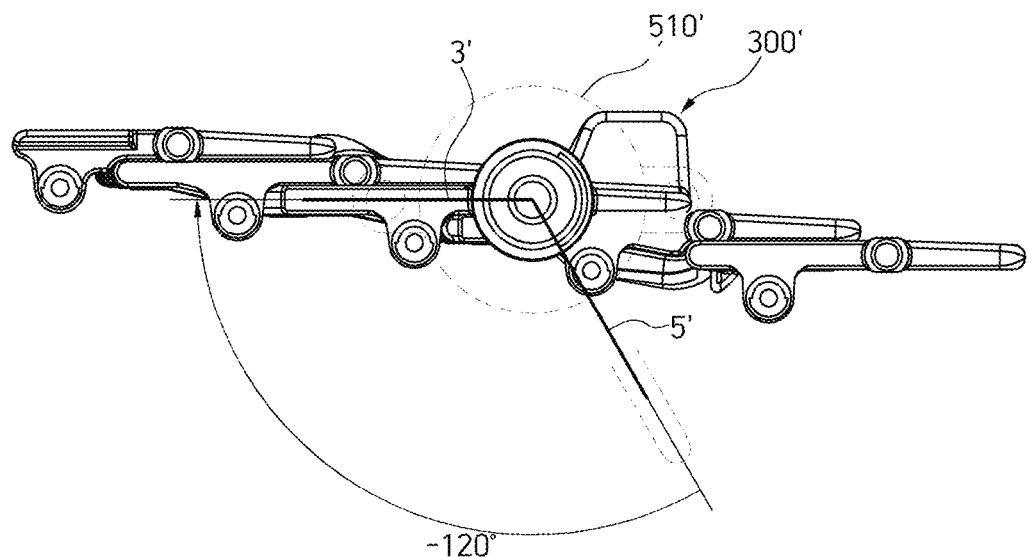
Figure 12:
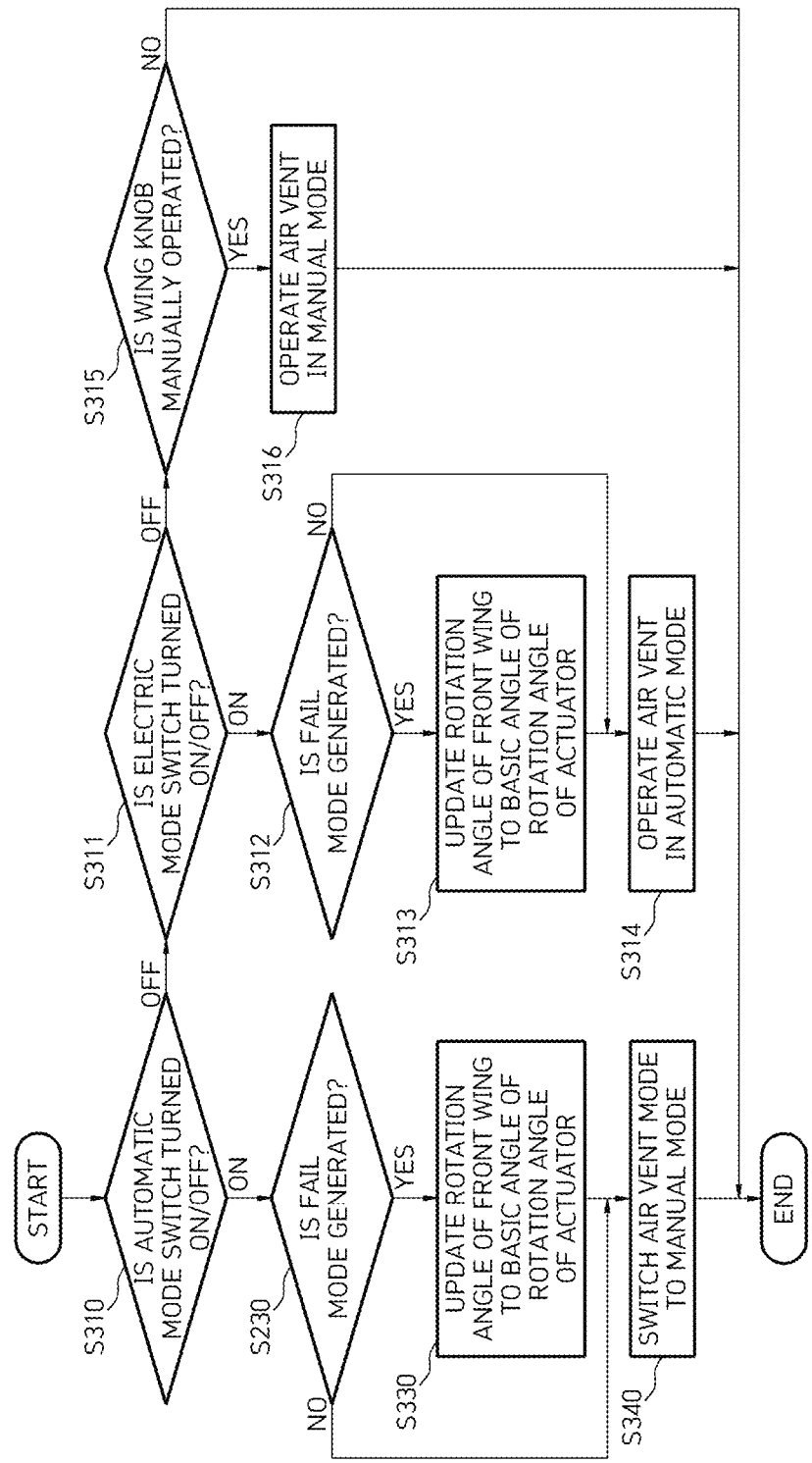
FIG. 12 is a flowchart illustrating an operation method of the vehicle air vent structure according to another embodiment of the present invention.
Figure 13:
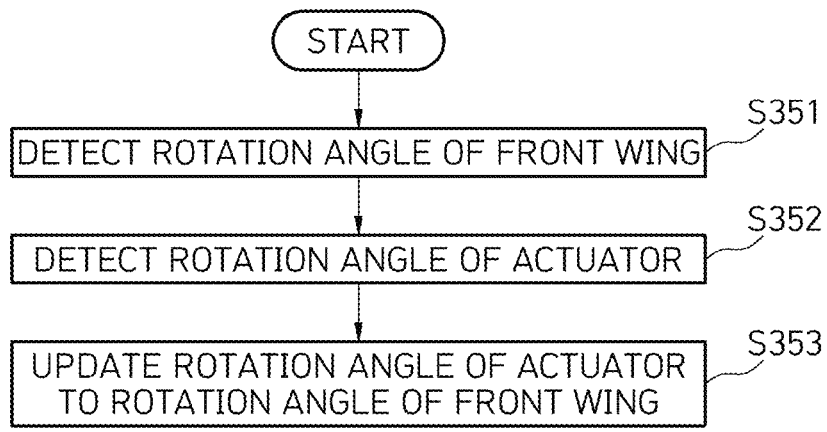
FIG. 13 is a flowchart for describing detailed operations of an operation in which an air vent is operated in an automatic mode in another embodiment of the present invention.

FIG. 11A to 11C is an operation diagram illustrating the operation state of the front wing according to another embodiment of the present invention, FIG. 12 is a flowchart illustrating the operation method of the vehicle air vent structure according to another embodiment of the present invention, and FIG. 13 is a flowchart for describing the detailed operations of an operation in which the air vent is operated in the automatic mode in another embodiment of the present invention.

Meanwhile, in the modes of the air vent to be described below, the automatic mode refers to a mode in which the front wing 300' repeatedly moves laterally according to the operation of the actuator 510' of the driving motor, and the electric mode refers to a mode in which the front wing 300' moves only once in one of the left and right directions according to the operation of the actuator 510' of the driving motor.

In addition, the manual mode refers to a mode in which a passenger in the vehicle holds the wing knob 220' and directly moves the wing knob 220' laterally.

In addition, in a FAIL mode, the front wing 300' rotates separately from the actuator 510' in the manual mode in a state in which the rotation of the actuator 510' is fixed, and a directivity angle 5' of the actuator and a directivity angle 3' of the front wing are inconsistent with each other.

For example, in the FAIL mode, in a state where the automatic mode or electric mode is operated and the actuator 510' so that the front wing 300' are rotated together from 0°, as illustrated in FIG. 11A, to +30°, as illustrated in FIG. 11B, and the directivity angle 5' of the actuator and the directivity angle 3' of the front wing coincide with each other, as illustrated in FIG. 11C, a user rotates the front wing 300' to −120° in the clockwise direction through the manual mode so that the directivity angle of the front wing is −120° and the directivity angle 5' of the actuator is +30°, and thus the directivity angle 5' of the actuator and the directivity angle 3' of the front wing are inconsistent with each other.

Referring to FIG. 12, it is determined whether the automatic mode switch for operating the air vent in the automatic mode is in an on state (S310).

When the automatic mode switch is in the on state in operation S310 in which whether the automatic mode switch is in the on state is determined, it is determined whether the FAIL mode occurs in the air vent (S320).

When the FAIL mode occurs in operation S320 in which whether the FAIL mode occurs in the air vent is determined, the rotation angle of the front wing 300' is updated to a basic angle of the rotation angle of the actuator 510' (S330).

For example, when the rotation angle of the front wing 300' is +30° and the rotation angle of the actuator 510' is −120°, the rotation angle of the actuator 510' is updated to +30°.

That is, the actuator 510' does not rotate to +150° to coincide with the rotation angle of the front wing 300' at −120°, but the basic angle of the actuator is updated to +30° which is the rotation angle of the front wing 300' in a state where the rotation angle of the actuator 510' is −120°.

Then, when the rotation angle of the actuator 510' is updated to the rotation angle of the front wing 300', the air vent is operated in the automatic mode (S340).

Meanwhile, when the FAIL mode does not occur in operation S320 in which whether the FAIL mode occurs in the air vent is determined, the air vent is operated in the automatic mode (S340).

Meanwhile, when the automatic mode switch is in an off state in operation S310 in which whether the automatic mode switch is in the on state is determined, it is determined whether the electric mode switch for operating the air vent in the electric mode is in an on state (S311).

In addition, when the electric mode switch is in the on state in operation S311 in which whether the electric mode switch is in the on state is determined, it is determined whether the FAIL mode occurs in the air vent (S312).

When the FAIL mode occurs in operation S312 in which whether the FAIL mode occurs in the air vent is determined, the rotation angle of the front wing 300' is updated to the basic angle of the rotation angle of the actuator 510' (S313).

Moreover, when the rotation angle of the actuator 510' is updated to the rotation angle of the front wing 300', the air vent is operated in the electric mode (S314).

Meanwhile, when the FAIL mode does not occur in operation S312 in which whether the FAIL mode occurs in the air vent is determined, the air vent is operated in the electric mode (S314).

Meanwhile, when the electric mode switch is in an off state in operation S311 in which whether the electric mode switch is in the on state is determined, it is determined whether the wing knob 220' of the air vent is manually operated (S315).

In addition, when the wing knob 220' of the air vent is manually operated in operation S315 in which whether the wing knob 220' of the air vent is manually operated is determined, the air vent is operated in the manual mode (S316).

In this case, when the air vent is operated in the manual mode (S316), there is no need to update the basic angle of the actuator 510' as the front wing 300' moves separately from the actuator 510'.

Meanwhile, in operations S330 and S313 in which the rotation angle of the front wing 300' is updated to the basic angle of the rotation angle of the actuator 510', the rotation angle of the front wing 300' (operated in the manual mode) is detected (S351), and the rotation angle of the current actuator 510' is detected (S352).

Then, the rotation angle of the actuator 510' is updated to the rotation angle of the front wing 300' (S353).

In this case, the rotation angle of the front wing 300' may be detected by the rotation detection sensor 600' coupled to the front wing 300', and the rotation angle of the actuator 510' may be detected through a step motor.

As described above, in the vehicle air vent structure and the operation method according to another embodiment of the present invention, it is possible to easily correct the FAIL mode of the air vent using the rotation detection sensor 600'.

Meanwhile, a vehicle air vent structure according to still another embodiment of the present invention may detect a deviation between directivity angles of a front wing 300" and a driving member 500" through a limit switch 700".

Hereinafter, still another embodiment of the vehicle air vent structure of the present invention will be described in detail with reference to the accompanying drawings.

Figure 14:
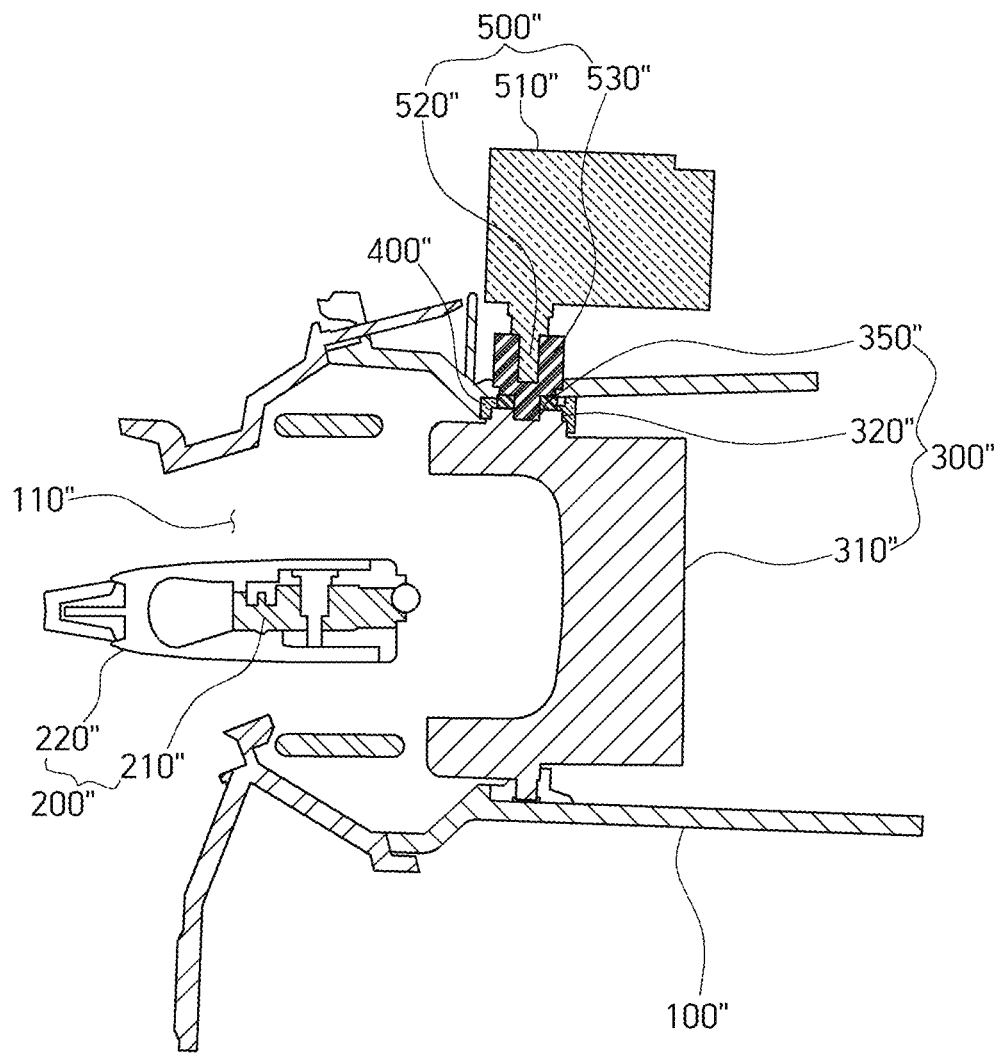
FIG. 14 is a cross-sectional view illustrating a cross section of the vehicle air vent structure according to another embodiment of the present invention.
Figure 15:
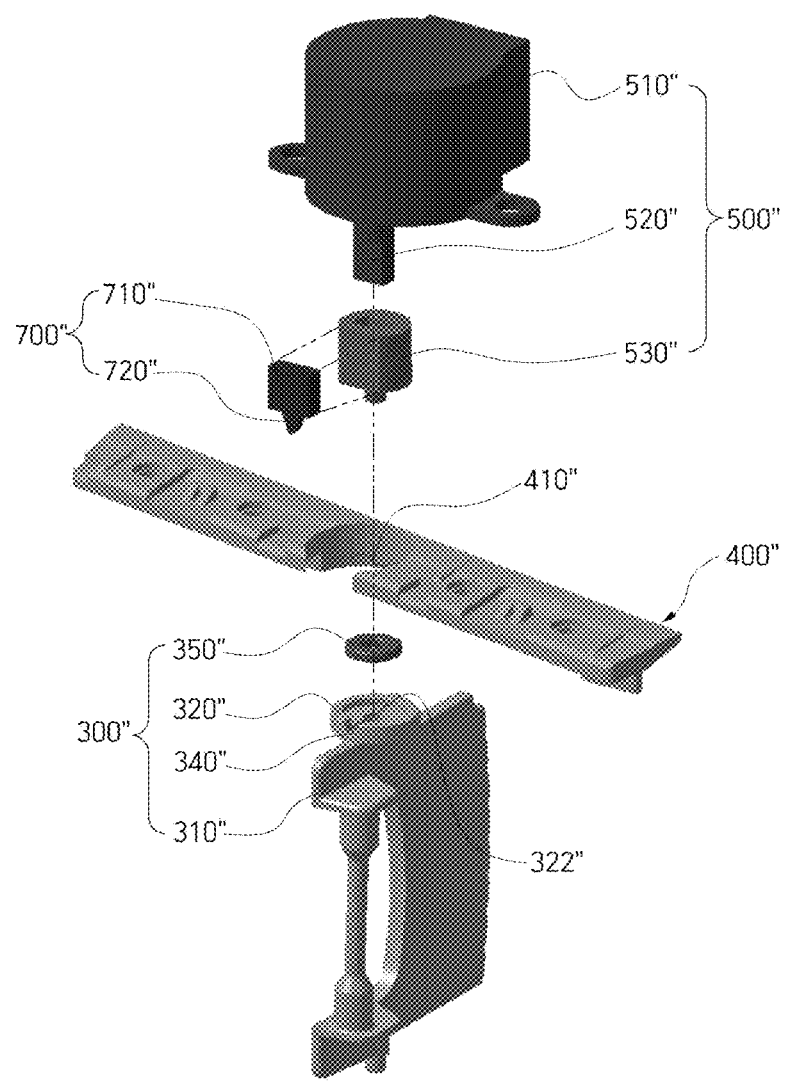
FIG. 15 is an exploded perspective view of a part of an air vent structure according to still another embodiment of the present invention.

FIG. 14 is a cross-sectional view illustrating a cross section of the vehicle air vent structure according to still another embodiment of the present invention, and FIG. 15 is an exploded perspective view of a part of the air vent structure according to still another embodiment of the present invention.

Referring to FIGS. 14 and 15, the vehicle air vent structure according to still another embodiment of the present invention includes a vent duct 100", a rear wing 200", the front wing 300", a spacer 400", the driving member 500", and the limit switch 700".

The vent duct 100" forms a body of the air vent, preferably has a quadrangular frame shape, and is connected to air conditioners located therebehind. In the vent duct 100", a discharge port 110" through which air generated from the air conditioners is discharged into a vehicle interior is formed at a front surface of the vent duct 100" that faces the vehicle interior.

The vent duct 100" is preferably fixed to a crush pad of the vehicle.

The rear wing 200" is accommodated in a region of the discharge port 110" of the vent duct 100", is elongated in the width direction of the vent duct 100", and is rotatably coupled to the vent duct 100".

The rear wing 200" includes a rear body portion 210" and a wing knob 220".

The rear body portion 210" forms a body of the rear wing 200" and is exposed to the outside from the discharge port 110", and the wing knob 220" is coupled to a center portion of the rear body portion 210" to control the wing knob 220".

The wing knob 220" is coupled to the rear body portion 210" and the front body portion 310" of the front wing 300" to control a right-left rotation of the front wing 300" and an up-down direction of the rear wing 200".

That is, the wing knob 220" can easily control the direction of the air discharged from the discharge port 110" of the vent duct 100".

The front wing 300" includes a plurality of wings, is disposed behind the rear wing 200", and is disposed to extend in a direction perpendicular to the rear wing 200", that is, in a height direction of the vent duct 100". Moreover, the plurality of front wings 300" are spaced apart from each other by a distance in a width direction of the vent duct 100", and each of the front wings 300" is rotatably coupled to the vent duct 100".

In addition, when an operation mode of the air vent is an electric mode, the front wing 300" rotates only once at a preset angle according to the operation of the driving member 500", and when the operation mode is an automatic mode, the front wing 300" repeatedly rotates at a preset angle according to the operation of the driving member 500". Moreover, when the operation mode is a manual mode, a passenger in the vehicle holds a knob and moves the knob in the lateral direction to control the rotation of the front wing 300".

The front wing 300" includes a front body portion 310", a coupling protrusion 320", a protrusion insertion portion 340", and a wing hinge pressing member 350".

The front body portion 310" forms a body of the front wing 300", and a plurality of front body portions are disposed to be spaced apart from each other by a distance in the width direction of the vent duct 100".

The coupling protrusion 320" passes through upper and lower surfaces of the vent duct 100", and the driving member 500" disposed on the upper surface of the vent duct 100" is rotatably coupled.

Accordingly, the front wing 300" is connected to the driving member 500" through the coupling protrusion 320" and may rotate at a preset angle according to driving of the driving member 500" when the operation mode of the air vent is the electric mode.

The protrusion insertion portion 340" is formed in an upper portion of the front body portion 310", and the limit switch 700" is inserted thereinto.

The protrusion insertion portion 340" is formed as a "V"-shaped groove in the upper portion of the front body portion 310".

The through groove 322" is formed in an upper portion in the direction in which the driving member 500" is disposed in the coupling protrusion 320" so that the driving member 500" passes through the through groove 322".

The wing hinge pressing member 350" is fixed to the upper surface of the coupling protrusion 320" in the front body portion 310" and is preferably formed in a donut shape so that a shaft bush 530" of the fixed driving member 500" passes through an inner peripheral surface of the wing hinge pressing member 350".

The wing hinge pressing member 350" is made of an elastic material such as rubber.

The spacer 400" is elongated in the width direction of the vent duct 100" and is rotatably fixed to the upper surface of the front wing 300".

To this end, a coupling groove 410" is formed in the spacer 400".

The coupling groove 410" is provided as a plurality of coupling grooves 410", and the plurality of coupling grooves 410" are spaced apart from each other by a distance in the width direction of the vent duct 100" in the spacer 400". Moreover, the coupling protrusion 320' of the front wing 300" passes through the coupling groove 410".

That is, the coupling protrusions 320" formed on the upper surface of the plurality of front wings 300" are rotatably coupled to the plurality of coupling grooves 410".

Moreover, any one of the plurality of front wings 300" is coupled to the driving member 500".

That is, the coupling protrusions 320" formed on the upper surface of the plurality of front wings 300" are rotatably fixed to the coupling grooves 410", and thus, the plurality of front wings 300" are connected together to the spacer 400". Therefore, when the front wing 300" connected to the fixed driving member 500" among the plurality of the front wing 300" rotates according to the driving of the driving member 500", the spacer 400" rotates the remaining front wings 300" at a preset angle while performing a linear motion.

Accordingly, the spacer 400" can easily rotate the plurality of front wings 300" to adjust the wind direction of the air.

The driving member 500" selectively rotates the front body portion 310" of the front wing 300" depending on whether external power is applied to generate a driving force and is mounted outside the vent duct 100".

Specifically, the driving member 500" is coupled to the coupling protrusion 320" of the front wing 300".

Moreover, the driving member 500" is coupled to any one of the plurality of front wings 300".

The driving member 500" includes an actuator 510", a fixed shaft 520", and the shaft bush 530".

In addition, the driving member 500" may include the actuator 510" having a step motor function.

The actuator 510" preferably has a stem motor function and is mounted outside the vent duct 100".

Moreover, the actuator 510" is connected to the front body portion 310" of the front wing 300" to rotate the front body portion 310" of the front wing 300 when a driving force is generated.

The fixed shaft 520" has a cylindrical shape and extends from the actuator 510" in a direction in which the front wing 300" is disposed.

The fixed shaft 520" is inserted into the shaft bush 530", and the shaft bush 530" passes through the wing hinge pressing member 350" and is rotatably coupled to the through groove 322" of the front wing 300".

Then, the shaft bush 530" passes through the wing hinge pressing member 350" and, at the same time, selectively presses the wing hinge pressing member 350" in the direction in which the front wing 300" is disposed.

Meanwhile, when the operation mode of the air vent is the electric mode or the automatic mode, the wing hinge pressing member 350" made of an elastic material rotates together with the wing hinge pressing member 350" in contact with the lower surface of the shaft bush 530" while the shaft bush 530" rotates.

Accordingly, the front wing 300" forming the coupling protrusion 320" to which the wing hinge pressing member 350" is fixed also rotates together.

However, in a case where the operation mode of the air vent is the manual mode, when the passenger holds and moves the knob laterally, a rotational force greater than a friction force between the lower surface of the shaft bush 530" and the wing hinge pressing member 350" is generated, and thus, the front wing 300" rotates independently of the driving member 500".

Accordingly, when the driving force is generated from the actuator 510" of the driving member 500", the front wing 300" rotates together with the actuator 510" of the driving member 500", and when the driving force is blocked from the actuator 510" of the driving member 500", the front wing 300" may be rotated in the manual mode.

The limit switch 700" is fixed to the driving member 500" and detects the deviation between the directional angle of the front wing 300" and the directional angle of the actuator.

Specifically, when the front wing 300" is moved to the manual mode, the limit switch 700" detects the deviation between the directional angle of the front wing 300" and the directional angle of the actuator 510".

Moreover, the limit switch 700" is fixed to the outer peripheral surface of the shaft bush 530" of the driving member 500".

This limit switch 700" includes a switch body portion 710" and a variable protrusion portion 720".

The switch body portion 710" forms a body of the limit switch 700" and is fixed to an outer peripheral surface of the shaft bush 530" of the driving member 500".

That is, the limit switch 700" rotates together with the shaft bush 530".

The variable protrusion portion 720" may check whether the directional angle of the actuator 510" coincides with the directional angle of the front wing 300".

Specifically, when the directivity angle of the actuator 510" and the directivity angle of the front wing 300" coincide with each other, the variable protrusion portion 720" protrudes downward from the switch body portion 710" and is elastically inserted into the protrusion insertion portion 340" of the front wing 300".

Moreover, in a case where the directivity angle of the actuator 510" and the directivity angle of the front wing 300" do not match with each other, when the variable protrusion portion 720" is in contact with the upper surface of the front body portion 310", the variable protrusion portion 720" is inserted into the switch body portion 710".

To this end, the variable protrusion portion 720" has an inverted triangular shape corresponding to the protrusion insertion unit 340".

Accordingly, when the directivity angle of the actuator 510" and the directivity angle of the front wing 300" are inconsistent with each other, the variable protrusion portion 720" may be easily inserted into the switch body portion 710" along an inclined surface of the variable protrusion portion 720" and an inclined surface of the protrusion insertion portion 340".

Hereinafter, an operation method of the vehicle air vent structure according to still another embodiment of the present invention will be described in detail with reference to the accompanying drawings.

FIGS. 16A to 16E are operational views illustrating the operation state of the front wing according to still another embodiment of the present invention, and FIG. 17 is a flowchart illustrating the operation method of the vehicle air vent structure according to still another embodiment of the present invention.

Referring to FIGS. 16A to 16E and 17, it is determined whether an electric mode switch for operating the air vent in the electric mode is in an on state (S410).

In addition, when the electric mode switch is in the on state in operation S410 in which whether the electric mode switch is in the on state is determined, the air vent operates in the electric mode (S420).

Then, the limit switch 700" detects the deviation (S430).

Here, the deviation detected by the limit switch 700" refers to a state in which the directivity angle of the actuator 510" and the directivity angle of the front wing 300" are inconsistent with each other.

Figure 16A:
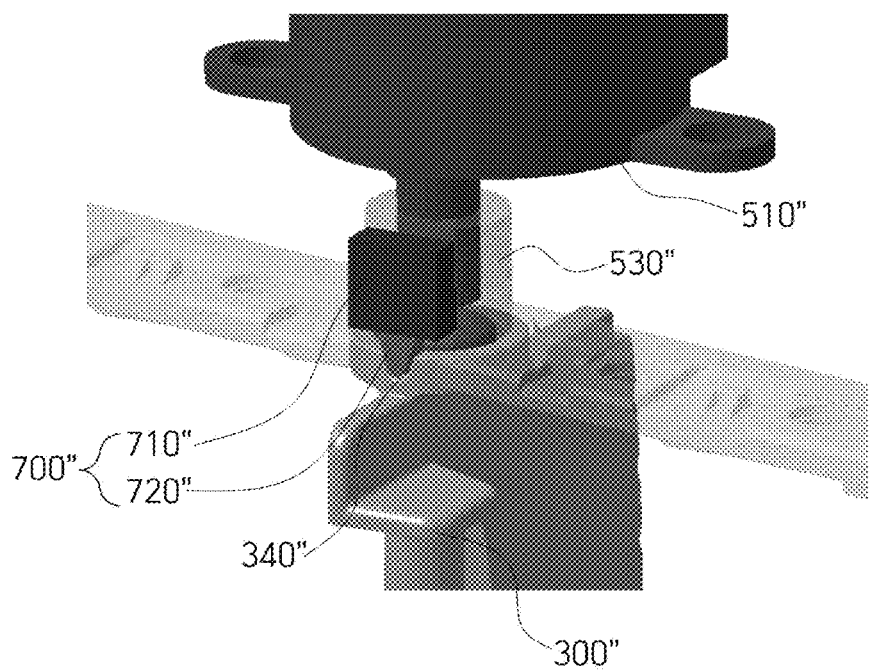
FIGS. 16A to 16E are operational views illustrating an operation state of a front wing according to still another embodiment of the present invention.
Figure 16B:
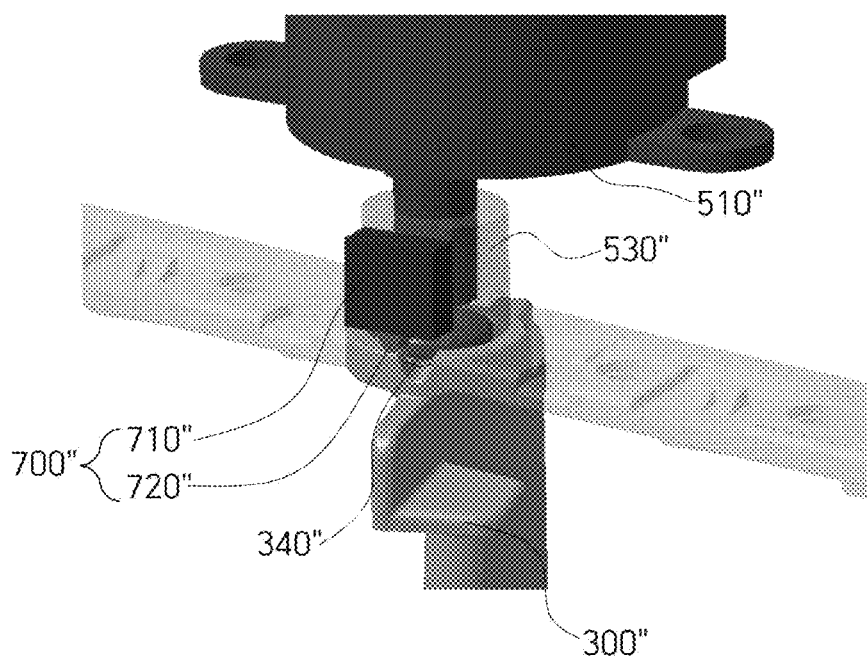

Specifically, when the mode of the air vent is the electric mode, the variable protrusion portion 720" of the limit switch 700" fixed to the shaft bush 530" of the actuator 510", as illustrated in FIG. 16A, rotates together with the actuator 510" and the front wing 300" in a state of being inserted into the protrusion insertion portion 340" of the front wing 300".

In this case, when the user in the vehicle rotates the wing knob 220" without ending the electric mode and the air vent is forcibly operated in the manual mode, the front wing 300" rotates more than the actuator 510". Accordingly, as illustrated in 16B, the variable protrusion portion 720" of the limit switch 700" inserted into the protrusion insertion portion 340″ of the front wing 300″ is separated from the protrusion insertion portion 340″.

Accordingly, the directivity angle of the actuator 510″ and the directivity angle of the front wing 300″ are inconsistent with each other.

Then, in the electric mode, the actuator 510″ and the front wing 300″ rotate together in the same direction (S440).

Figure 16C:
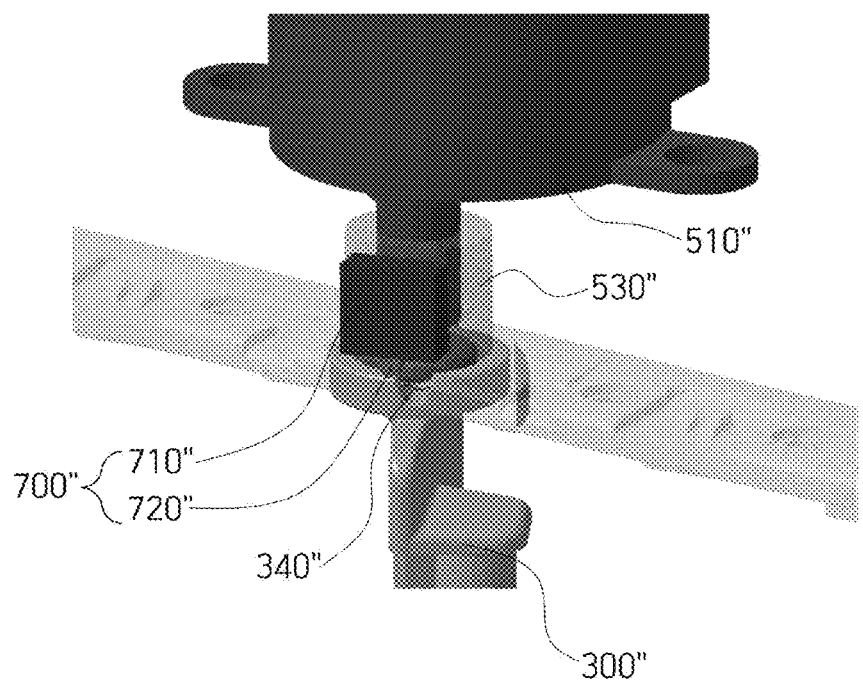

That is, since the air vent mode is in the electric mode and operation S420 has not been completed, even after the limit switch 700″ detects the deviation between the directivity angle of the actuator 510″ and the directivity angle of the front wing 300″ in the manual mode, as illustrated in FIG. 16C, the actuator 510″ and the front wing 300″ rotate together in the same direction.

In this case, the variable protrusion portion 720″ of the limit switch 700″ is pressed by the front body portion 310″.

Figure 16D:
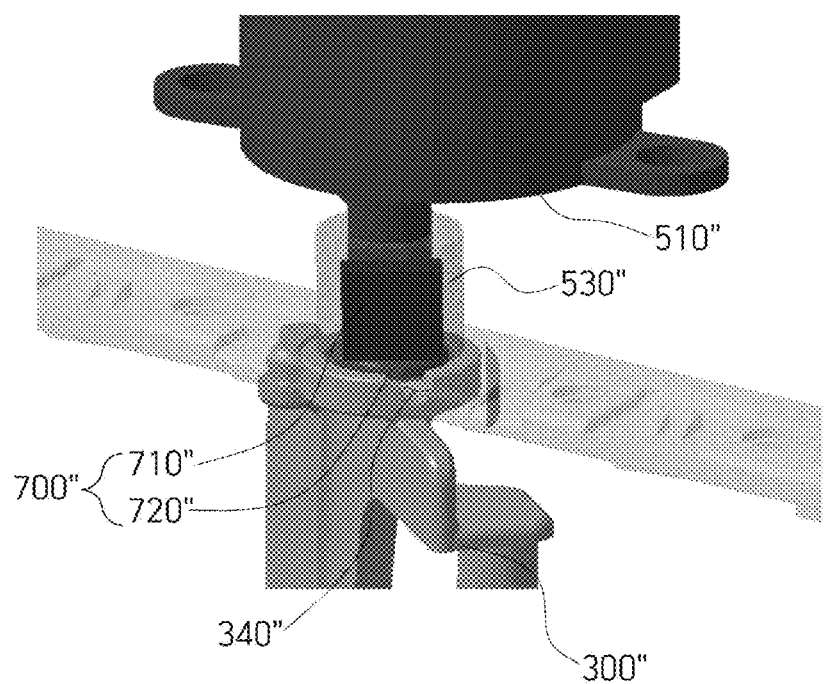

Then, as illustrated in FIG. 16D, the front wing 300″ is stopped by a stopper (not illustrated), and only the actuator 510″ rotates (S450).

Next, it is determined whether the directivity angle of the actuator 510″ and the directivity angle of the front wing 300″ coincide with each other (S460).

In operation S460 in which whether the directivity angle of the actuator 510″ and the directivity angle of the front wing 300″ coincide with each other is determined, when the directivity angle of the actuator 510″ and the directivity angle of the front wing 300″ coincide with each other, the rotation of the actuator 510″ is stopped (S470).

Figure 16E:
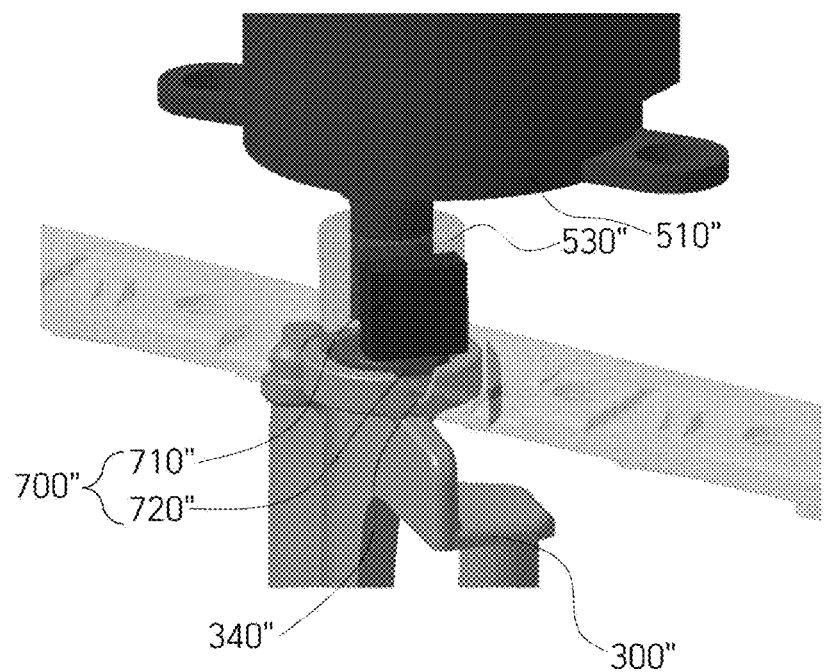

Specifically, when the front wing 300″ is stopped by the stopper, as illustrated in FIG. 16E, the variable protrusion portion 720″ of the limit switch 700″ fixed to the actuator 510″ is inserted into the protrusion insertion portion 340″ formed in the front wing 300″.

Accordingly, the limit switch 700″ detects that the directional angle of the actuator 510″ and the directional angle of the front wing 300″ coincide with each other, and the rotation of the actuator 510″ is stopped.

Meanwhile, the state in which the front wing 300″ is stopped by the stopper is a state in which the front wing 300″ is rotated up to the maximum rotation range, and excessive rotation of the front wing 300″ is limited by the stopper.

Meanwhile, in the operation of determining whether the directivity angle of the actuator 510″ and the directivity angle of the front wing 300″ coincide with each other (S460), when the directivity angle of the actuator 510″ and the directivity angle of the front wing 300″ are inconsistent with each other, the front wing 300″ is stopped by the stopper and operation S450 in which only the actuator 510″ rotates is repeated.

That is, it is determined that the variable protrusion portion 720″ of the limit switch 700″ has not yet reached the protrusion insertion portion 340″ of the front wing 300″, and the actuator 510″ continues to rotate until the variable protrusion portion 720″ of the limit switch 700″ is inserted into the protrusion insertion portion 340″ of the front wing 300″.

Meanwhile, when the electric mode switch is in an off state in operation S410 in which whether the electric mode switch is in the on state is determined, it is determined whether the wing knob 220″ of the air vent is manually operated (S411).

Moreover, when the wing knob 220″ of the air vent is manually operated in operation S411 in which whether the wing knob 220″ of the air vent is manually operated is determined, the air vent is operated as a manual mode (S412).

As described above, in the vehicle air vent structure and the operation method according to still another embodiment of the present invention as described above, the deviation between the directivity angle of the actuator 510″ and the directivity angle of the front wing 300″ can be easily corrected by the limit switch 700″.

As described above, there is provided a vehicle air vent structure capable of implementing a manual method and an electric method of an air vent at the same time.

According to the present invention, it is possible to use an automatic mode, an electric mode, and a manual mode at the same time as an operation mode of an air vent, and it is possible to intuitively operate a wind direction and an air volume discharged from the air vent and possible to design various functions according to a use environment.

The embodiments disclosed in the present specification should be considered from an exemplary point of view for description rather than a limiting point of view. A scope of the present invention is set forth in claims rather than the foregoing description, and all differences within an equivalent scope are to be construed as being included in the present invention.

What is claimed is:
1. A vehicle air vent structure comprising:
   a vent duct having a front surface facing a vehicle interior and being open to form a discharge port configured to discharge air;
   a rear wing accommodated in a region of the discharge port and being rotatably coupled to the vent duct;
   a front wing disposed in a direction orthogonal to the rear wing behind the rear wing;
   a spacer elongated in a width direction of the vent duct and connected to the front wing;
   a driver mounted outside the vent duct and coupled to the spacer to provide a driving force to move the spacer to selectively rotate the front wing; and
   a rotation detection sensor configured to detect a rotation angle of the front wing,
   wherein, in response to the driving force being generated from the driver and the rotation detection sensor does not detect a change in the rotation angle of the front wing, the front wing is configured to be manually rotatable,
   wherein the rear wing includes a wing knob and a rear body portion, the wing knob coupled to the rear body portion and the front wing to control a right-left rotation of the front wing and an up-down direction of the rear wing, and
   wherein the driver includes an actuator coupled to the front wing to rotate the front wing, and a fixed shaft extending from the actuator in a direction in which the front wing is disposed, the fixed shaft being inserted into a shaft bush.

2. A vehicle air vent structure comprising:
   a vent duct having a front surface facing a vehicle interior and being open to form a discharge port configured to discharge air;
   a rear wing accommodated in a region of the discharge port and being rotatably coupled to the vent duct;
   a front wing disposed in a direction orthogonal to the rear wing behind the rear wing;
   a spacer elongated in a width direction of the vent duct and connected to the front wing;
   a driver mounted outside the vent duct and coupled to the spacer to provide a driving force to move the spacer to selectively rotate the front wing; and a rotation detection sensor configured to detect a rotation angle of the front wing, wherein, in response to the driving force being generated from the driver and the driving force is blocked from the driver, the front wing is manually rotatable, wherein the front wing comprises:
a front body portion;
a coupling protrusion protruding from an upper portion of the front body portion in a direction in which the driver is disposed;
a through groove formed in an upper portion of the coupling portion in the direction in which the driver is disposed, the driver passing through the through groove; and
a wing hinge pressing member fixed at a position on the front body portion corresponding to the through groove, wherein a stepped portion configured to limit a rotation of the front wing is formed on an outer peripheral surface of the coupling protrusion, and wherein the driver includes an actuator coupled to the front wing to rotate the front wing, and a fixed shaft extending from the actuator in a direction in which the front wing is disposed, the fixed shaft being inserted into a shaft bush.

3. The vehicle air vent structure of claim 2, wherein the through groove and the wing hinge pressing member are formed in the front wing.

4. The vehicle air vent structure of claim 3, wherein the driver is coupled to the front wing.

5. The vehicle air vent structure of claim 3, wherein the actuator is coupled to the front wing to rotate the front wing in response to the driving force being generated, wherein the fixed shaft extends from the actuator in a direction in which the front wing is disposed, and wherein the fixed shaft is inserted into the shaft bush pressing the wing hinge pressing member.

6. The vehicle air vent structure of claim 5, wherein the shaft bush comprises:
a bush body portion forming a body; and
a through protrusion passing through the wing hinge pressing member to pass through the through groove.

7. The vehicle air vent structure of claim 2, wherein the spacer comprises:
a coupling groove passing through the coupling protrusion; and
a stopper formed on an inner peripheral surface of the coupling groove, the stopper being in contact with the stepped portion to limit the rotation of the front wing.

8. The vehicle air vent structure of claim 7, wherein each of the stepped portion and the stopper is formed in a sectoral shape.

9. The vehicle air vent structure of claim 8, wherein the stepped portion and the stopper are disposed to be misaligned.

10. The vehicle air vent structure of claim 9, wherein each of the stepped portion and the stopper is formed at 120°.

* * * * *